(12) United States Patent
Tanaka

(10) Patent No.: US 9,344,831 B2
(45) Date of Patent: May 17, 2016

(54) CELLULAR PHONE

(71) Applicant: Rohm Co., Ltd., Kyoto (JP)

(72) Inventor: Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/319,174

(22) Filed: Jun. 30, 2014

(65) Prior Publication Data

US 2014/0315526 A1 Oct. 23, 2014

Related U.S. Application Data

(63) Continuation of application No. 12/676,615, filed as application No. PCT/JP2008/066579 on Sep. 12, 2008, now Pat. No. 8,798,687.

(30) Foreign Application Priority Data

| Sep. 14, 2007 | (JP) | ................................ | 2007-239664 |
| Oct. 5, 2007 | (JP) | ................................ | 2007-261821 |
| Oct. 5, 2007 | (JP) | ................................ | 2007-262673 |
| Oct. 26, 2007 | (JP) | ................................ | 2007-278530 |

(51) Int. Cl.

| H04M 3/42 | (2006.01) |
| H04W 4/00 | (2009.01) |
| B60R 25/24 | (2013.01) |
| G07B 15/00 | (2011.01) |
| G07C 9/00 | (2006.01) |
| H04M 1/725 | (2006.01) |
| B60R 25/10 | (2013.01) |

(52) U.S. Cl.
CPC ............ H04W 4/00 (2013.01); B60R 25/10 (2013.01); B60R 25/24 (2013.01); B60R 25/241 (2013.01); G07B 15/00 (2013.01); G07C 9/00309 (2013.01); G07C 9/00857 (2013.01); H04M 1/72533 (2013.01); B60R 2325/205 (2013.01); G07C 2009/00865 (2013.01); G07C 2009/00928 (2013.01); G07C 2209/08 (2013.01); H04M 2250/10 (2013.01)

(58) Field of Classification Search
CPC ........................................................ H04W 4/00
USPC ..................................................... 455/414.1
See application file for complete search history.

(56) References Cited

U.S. PATENT DOCUMENTS 6,163,846 A 12/2000 Kakihara
6,650,999 B1 * 11/2003 Brust et al. .................... 701/517

(Continued)

FOREIGN PATENT DOCUMENTS

GB WO 2008020136 * 10/2007
JP 11-027873 1/1999

(Continued)

OTHER PUBLICATIONS

Japanese Office Action for JP application No. 2007-261821 dated Mar. 21, 2012.

*Primary Examiner* — Timothy Pham
(74) *Attorney, Agent, or Firm* — Fish & Richardson P.C.

(57) ABSTRACT

A cellular phone includes a telephone line communication part, a telephone functional part for making a telephone call via the telephone line communication part, an entry qualification holding part for holding fixed-term entry qualification information in which an entry target is specified, which is received via the telephone line communication part, and an entry communication part for transmitting the fixed-term entry qualification information held by the entry qualification holding part.

18 Claims, 16 Drawing Sheets

(56) References Cited

U.S. PATENT DOCUMENTS

| | | | |
|---|---|---|---|
| 2001/0020893 A1* | 9/2001 | Kawai et al. | 340/425.5 |
| 2003/0016828 A1 | 1/2003 | Bunte et al. | |
| 2003/0221070 A1 | 11/2003 | Minowa et al. | |
| 2004/0078607 A1 | 4/2004 | Feng | |
| 2005/0206242 A1 | 9/2005 | Kanouda et al. | |
| 2006/0111835 A1* | 5/2006 | Baker et al. | 701/207 |
| 2006/0143463 A1 | 6/2006 | Ikeda et al. | |
| 2008/0034205 A1 | 2/2008 | Alain et al. | |
| 2008/0197970 A1 | 8/2008 | Fouts | |
| 2009/0163140 A1 | 6/2009 | Packham et al. | |
| 2009/0261778 A1 | 10/2009 | Kook | |
| 2010/0085214 A1* | 4/2010 | Kim | G08G 1/14 340/932.2 |

FOREIGN PATENT DOCUMENTS

| | | |
|---|---|---|
| JP | 11-119869 | 4/1999 |
| JP | 2002-031835 | 1/2002 |
| JP | 2002-175589 | 6/2002 |
| JP | 2002-251583 | 9/2002 |
| JP | 2003-056232 | 2/2003 |
| JP | 2003-058795 | 2/2003 |
| JP | 2004-088339 | 2/2003 |
| JP | 2003-070176 | 3/2003 |
| JP | 2003-298733 | 10/2003 |
| JP | 2003-058795 | 3/2004 |
| JP | 2004-088337 | 3/2004 |
| JP | 2004-088339 | 3/2004 |
| JP | 2004-126729 | 4/2004 |
| JP | 2004-164115 | 6/2004 |
| JP | 2005-248624 | 9/2005 |
| JP | 2005-273264 | 10/2005 |
| JP | 2006-060683 | 3/2006 |
| JP | 2006-262184 | 9/2006 |
| JP | 2007-128428 | 5/2007 |
| JP | 2007-137136 | 6/2007 |
| JP | 2007-032134 | 8/2007 |
| JP | 2007-207187 | 8/2007 |

* cited by examiner

CELLULAR PHONE

CROSS-REFERENCE TO RELATED APPLICATIONS

This application is a continuation of U.S. patent application Ser. No. 12/676,615, filed Mar. 5, 2010, which is a U.S. National Phase Application of PCT/JP2008/066579, filed Sep. 12, 2008, which claims the benefit of Japanese Patent Application Nos.:
   JP2007-239664, filed Sep. 14, 2007
   JP2007-278530, filed Oct. 26, 2007
   JP2007-261821, filed Oct. 5, 2007
   JP2007-262673, filed Oct. 5, 2007
the entire contents of which are incorporated herein by reference.

TECHNICAL FIELD

The present invention relates to a communication apparatus such as a cellular phone.

BACKGROUND ART

In recent years, particularly as a key for a vehicle, a keyless entry system has become widespread. Further, in the keyless entry system, it is also common that an entry code is exchanged by short-range wireless communication only by carrying an electronic key and approaching a vehicle without operating the same, so that the door is opened with the electronic key in a pocket. Further, there are various proposals about associating the keyless entry function with a cellular phone. For instance, Patent Document 1 discloses a keyless entry system in which a cellular phone and a vehicle-mounted machine perform short-range communication with each other so as to lock and unlock a door lock mechanism. In addition, Patent Document 2 proposes a car rental system in which a cellular phone having a keyless entry function receives an entry code transmitted from a management server in long distance, so as to open a lock of a cellular phone vehicle.
   Patent Document 1: JP-A-2006-60683
   Patent Document 2: JP-A-2003-58795

DISCLOSURE OF THE INVENTION

Problem to be Solved by the Invention

However, there are various problems to be studied about functions of a communication apparatus such as a cellular phone in its practical use.

In view of the above description, an object of the present invention is to provide a communication apparatus that can handle practical entry information.

Means for Solving the Problem

In order to achieve the above-described object, a cellular phone according to the present invention includes a telephone line communication part, a telephone functional part for making a telephone call via the telephone line communication part, an entry qualification holding part for holding fixed-term entry qualification information in which an entry target is specified, which is received via the telephone line communication part, and an entry communication part for transmitting the fixed-term entry qualification information held by the entry qualification holding part (as a first structure). Thus, the cellular phone transmits the entry qualification information so that it is decided whether or not the entry in a specific entry target is permitted, and in the case, since the entry qualification information is fixed-term information, it is adaptable against leakage or forgery thereof though it is received via a telephone line.

Note that the cellular phone having the above-described first structure preferably has a control part which updates the fixed-term entry qualification information held by the entry qualification holding part with a new fixed-term entry qualification information (second structure). With this structure, the one received last time becomes invalid by the update.

In addition, in the cellular phone having the above-described first structure, the entry qualification information received via the telephone line communication part is transmitted from a management function of the entry target (third structure). With this structure, the cellular phone is incorporated in an entry target management function.

In addition, in the cellular phone having the above-described first structure, the entry target is preferably a transportation facility (fourth structure).

In addition, in the cellular phone having the above-described fourth structure, the entry target is preferably a vehicle (fifth structure).

In addition, in the cellular phone having the above-described first structure, the entry target is preferably a facility (sixth structure).

In addition, in the cellular phone having the above-described sixth structure, the entry target is preferably a house (seventh structure).

In addition, the cellular phone having the above-described first structure preferably further includes a main power source for supplying electricity to the telephone line communication part and the telephone functional part, and an auxiliary power source for supplying electricity to the entry qualification information holding part (eighth structure).

In addition, a cellular phone according to the present invention includes a main power source, a telephone functional part supplied with electricity from the main power source, a telephone communication part supplied with electricity from the main power source, an auxiliary power source, and an entry process part supplied with electricity from the auxiliary power source (ninth structure). With this structure, the entry can be performed regardless of a state of the main power source.

Further, in the cellular phone having the above-described ninth structure, preferably, the main power source is rechargeable, the cellular phone further includes a storage part for storing data necessary for the telephone functional part by being supplied with electricity from the main power source and the auxiliary power source, and the entry process part and the auxiliary power source share the storage part (tenth structure). With this structure, it is possible to eliminate the inconvenience that the main power source is exhausted so that the entry cannot be performed. In addition, since power consumption of the entry process part is small, the auxiliary power source provided for backup of the storage part of the cellular phone can be shared with little loss of the backup function.

In addition, in the cellular phone having the above-described ninth structure, the entry process part preferably includes an entry qualification holding part for holding the entry qualification information, and an entry communication part for transmitting an entry qualification information held by the entry qualification holding part (eleventh structure). Thus, it is possible to realize the structure that is suitable for supplying electricity from the auxiliary power source.

In addition, the cellular phone having the above-described ninth structure preferably further includes a control part which alarms if the auxiliary power source is exhausted when the main power source is turned on (twelfth structure). With this structure, it is possible to check the entry function by the auxiliary power source at an appropriate timing.

In addition, the cellular phone having the above-described ninth structure preferably further includes a control part which alarms if the auxiliary power source is exhausted when the main power source is charged (third structure). With this structure, it is possible to check the entry function by the auxiliary power source at an appropriate timing.

In addition, the cellular phone having the above-described ninth structure preferably further includes a control part which controls the main power source to supply electricity to the entry process part if the auxiliary power source is exhausted when an entry operation is performed (fourteenth structure). Thus, even if the situation occurs in which further power consumption by of the auxiliary power source by the entry process part may cause disabled backup, the entry process can be performed.

In addition, the cellular phone having the above-described ninth structure preferably further includes a control part which turns on the main power source if it is turned off in accordance with an entry operation when the entry operation is performed, and turns off the main power source when the entry process is finished (fifteenth structure). This is useful particularly in the case it is necessary to perform the entry process by the main power source because the auxiliary power source is exhausted when the entry operation is performed. In addition, it is reasonable to structure so that the main power source is turned off when the entry process is finished.

In addition, a cellular phone according to the present invention includes a telephone line communication part, a telephone functional part for making a telephone call via the telephone line communication part, an entry qualification holding part for holding entry qualification information received from a management function of an entry target, a control part which updates the entry qualification information held by the entry qualification holding part with a newly received entry qualification information, and an entry communication part for transmitting the entry qualification information held by the entry qualification holding part (sixteenth structure). With this structure, it is possible to be adaptable against leakage or forgery of the entry code by updating.

In addition, in the cellular phone having the above-described sixteenth structure, the entry qualification information is preferably received by wireless communication (seventeenth structure). With this structure, the cellular phone in incorporated in the entry management function between long-distant sites.

In addition, in the cellular phone having the above-described sixteenth structure, the entry qualification information is preferably received by contact with the management function of the entry target (eighteenth structure). This structure is useful in the case where the management function of the entry target is close. As an appropriate example thereof, there is the case where the management function is a vehicle, and the cellular phone is placed in the vehicle for performing the reception and the like.

In addition, the cellular phone having the above-described eighteenth structure preferably further includes a rechargeable main power source for supplying electricity to the telephone line communication part and the telephone functional part, and a charge management part for charging the main power source by contact with the management function of the entry target (nineteenth structure). This structure is preferable as a motivation of making the cellular phone have contact with the entry target.

In addition, in the cellular phone having the above-described nineteenth structure, the control part preferably updates the entry qualification information held by the entry qualification holding part every time when the contact with the management function of the entry target is enabled (twelfth structure). With this structure, it is possible to update automatically the entry qualification information every time upon charging, so as to be adaptable against leakage or forgery of the entry code.

Note that the present invention can have various structures other than the above-described structures, which will be described in detail below.

Effects of the Invention

The cellular phone according to the present invention can handle the entry information practically.

Figure 1:
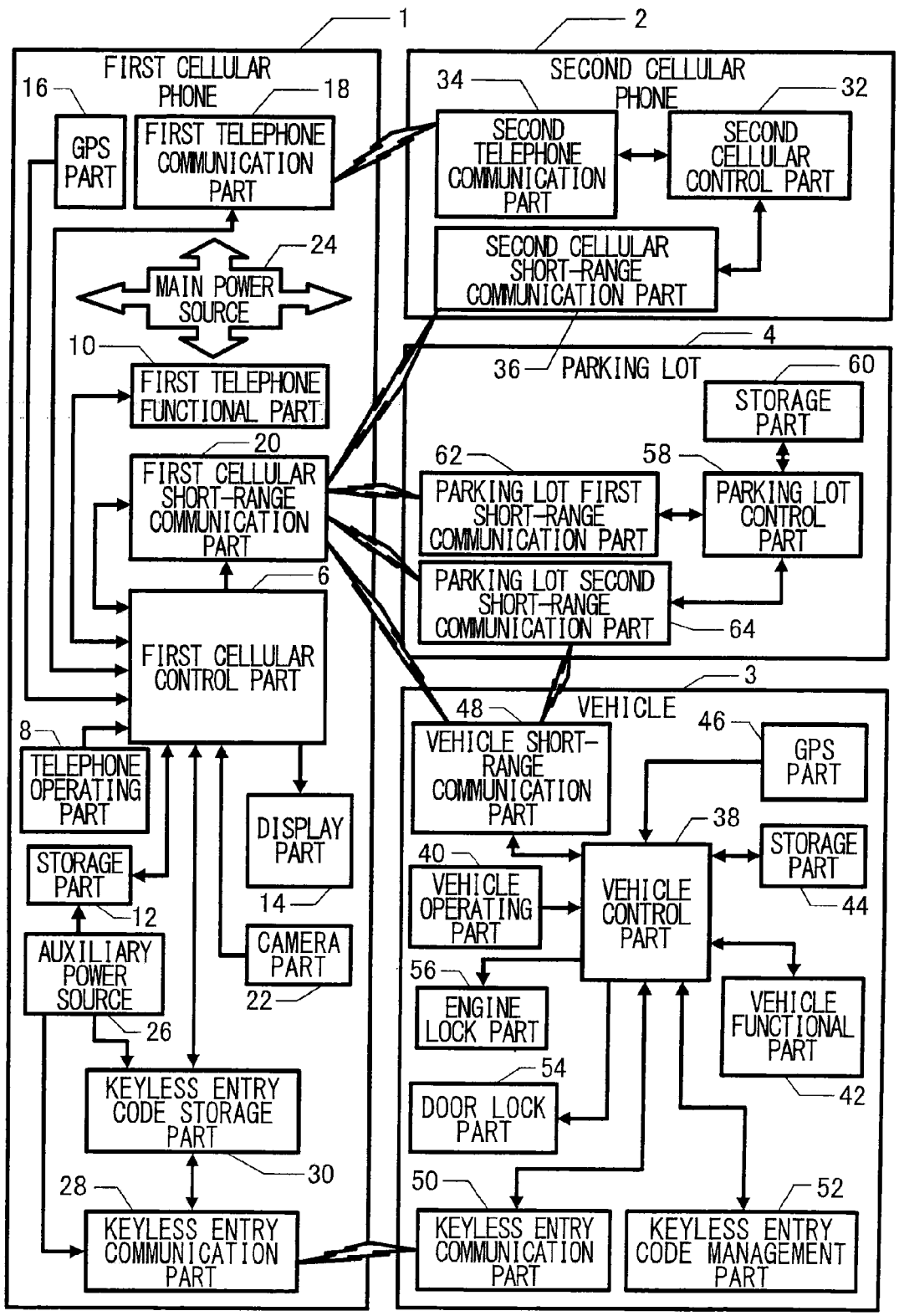
FIG. 1 is a block diagram illustrating Example 1 of a keyless entry system according to an embodiment of the present invention.

EXPLANATION OF NUMERALS 8, 16, 20 information input part
12 information holding part
18, 20 transmission part
30 keyless entry code holding part
18, 20 reception part
14 display part
38, 40, 44, 46 car navigation apparatus
6, 12, 14 map display system

BEST MODE FOR CARRYING OUT THE INVENTION

FIG. 1 is a block diagram illustrating Example 1 of a keyless entry system according to an embodiment of the present invention. Example 1 constitutes a system including a plurality of cellular phones. FIG. 1 illustrates a first cellular phone 1 and a second cellular phone 2. In addition, the structure inside the second cellular phone 2 is basically the same as that inside the first cellular phone 1 though it is simplified in FIG. 1. Note that only two cellular phones are illustrated in FIG. 1 for simplification, but third and other cellular phones having the same structure may be included. The keyless entry system according to the embodiment of the present invention further includes a vehicle 3 and a parking lot 4.

The first cellular phone 1 includes a first cellular control part 6 constituted of a computer for controlling the entire cellular phone, which controls a first telephone functional part 10 and the like responding to an operation of a telephone operating part 8. The function of the first cellular control part 6 is performed by software stored in a storage part 12. The storage part 12 also stores various data temporarily which are necessary for control of the entire first cellular phone 1. The first cellular control part 6 further controls a display part 14 so as to perform a GUI display in association with an operation of the telephone operating part 8 and to display a result of the control.

A GPS part 16 obtains latitude, longitude and altitude information as absolute positional information of the first cellular phone 1 based on a GPS system from satellites or nearest broadcasting stations and sends the information to the first cellular control part 6. This absolute positional information is displayed on the display part 14 together with a map by control of the first cellular control part 6 so as to be provided as navigation information.

The first cellular phone 1 can perform wireless communication including a normal telephone call via a telephone line by the first telephone functional part 10 and a first telephone communication part 18. Besides this, the first cellular phone 1 is provided with a first cellular short-range communication part 20 such as a wireless LAN, which enables wireless communication with other cellular phone or the like existing within the short-range communication area.

This first cellular short-range communication part 20 is based on specifications that do not cause a problem on legal regulations and has limited communication area with no charge unlike a telephone line.

The first cellular short-range communication part 20 communicates an entry code which will be described later, transmits the absolute positional information obtained with the GPS part 16 to a GPS part of other equipment, and can receive absolute positional information which other equipment obtains with its GPS part. Thus, it is possible to display not only its own position but also a position of other equipment on the same map with the display part 14 so that a relationship between them can be confirmed on the map. Details of this are described in Japanese Patent Application No. 2007-28393 filed by the same applicant, and the like. As described later, according to this function, it is possible, for example, to find a relationship between the vehicle 3 parked in the wide parking lot 4 and a present position of an owner of the first cellular phone 1, so that he or she can easily reach the vehicle 3.

In addition, the first cellular phone 1 has a camera part 22, can store taken images in the storage part 12, and can transmit the image to other cellular phone with the first telephone communication part 18.

The first cellular phone 1 is supplied with electricity from a rechargeable main power source 24, and the storage part 12 is further backed up by an auxiliary power source 26 such as a lithium battery. Thus, evaporation of information stored in the storage part 12 can be prevented when the main power source 24 is discharged or exchanged.

The first cellular phone 1 further includes a keyless entry communication part 28 and a keyless entry code storage part 30 working together with the same. These are supplied with electricity from the auxiliary power source 26 so as to work basically regardless of a charged state of the main power source 24 and an ON or OFF state thereof. Power consumption of the keyless entry communication part 28 is much smaller than the first short-range communication part 20, so the auxiliary power source 26 for the storage part 12 is also used for the same in this way.

Thanks to this function, the first cellular control part 6 is activated in a low speed power saving mode so as to perform a minimum function for a keyless entry operation, i.e., for operation of the telephone operating part 8 or detecting an entry operation of the vehicle 3 received by the keyless entry communication part 28, even if the main power source 24 is turned off, or if the main power source 24 is charged insufficiently to the state that is not sufficient for a normal cellular phone function.

In addition, the keyless entry code storage part 30 is connected also to the first cellular control part 6, so that locking and unlocking of the vehicle 3 based on the entry code stored in the keyless entry code storage part 30 can be performed not only by the keyless entry communication part 28 but also by the first cellular short-range communication part 20. However, as described later, locking and unlocking of the vehicle 3 is basically performed by the keyless entry communication part 28.

Example 1 illustrated in FIG. 1 has the structure in which the keyless entry communication part 28 receives control of the first cellular control part 6 as described above. As a variation example, however, it is possible to constitute the keyless entry communication part 28 to have no relationship with the first cellular control part 6. In this case, it is necessary to provide a special-purpose operating part for detecting a keyless entry operation. Note that it is possible to constitute the keyless entry operating part by sharing a part of operating keys of the telephone operating part 8 so that the keyless entry communication part 28 can directly detect an operation of the operating key.

The second cellular phone 2 has the same structure as the first cellular phone 1 as described above, and a description thereof will be omitted for avoiding overlapping description unless it is necessary. In addition, described above, illustration of the structure of the second cellular phone 2 in FIG. 1 is omitted except for a second cellular control part 32, a second telephone communication part 34 and a second cellular short-range communication part 36.

In addition, in FIG. 1, it is illustrated as if the first cellular phone 1 and the second cellular phone 2 communicate with each other directly, but as known well, the cellular phone utilizes infrastructure communication of a communication line. Therefore, the first telephone communication part 18 and the second telephone communication part 34 communicate with each other actually via base stations.

On the other hand, in FIG. 1, the first cellular phone 1 and the second cellular phone 2 can perform direct ad hoc communication with each other by using the first cellular short-range communication part 20 and the second cellular short-range communication part 36.

The vehicle 3 includes a vehicle control part 38 constituted of a computer for controlling the entire vehicle, to as to control a vehicle functional part 42 and the like in accordance with an operation of a vehicle operating part 40. Functions of this vehicle control part 38 are performed by software stored in a storage part 44. The storage part 44 also stores various data temporarily that are necessary for control of the vehicle 3.

A GPS part 46 is the same as the GPS part 16 of the first cellular phone 1, and it obtains latitude, longitude and altitude information as absolute positional information of the vehicle 3 based on a GPS system from satellites or nearest broadcasting stations and sends the information to the vehicle control part 38. This absolute positional information is displayed on a car navigation screen together with a map by control of the vehicle control part 38.

The vehicle 3 also has a vehicle short-range communication part 48 utilizing a wireless LAN or the like, which enables wireless communication with first cellular short-range communication part 20 or the like existing within the short-range communication area. As a matter of course, this vehicle short-range communication part 48 is based on the same standard with the first cellular short-range communication part 20 and has limited communication area with no charge unlike a telephone line.

The vehicle 3 further includes a keyless entry communication part 50 so as to communicate the entry code with the keyless entry communication part 28 of the first cellular phone 1. Then, the entry code is transmitted from the keyless entry code storage part 30 via the keyless entry communication part 28 and is received by the keyless entry communication part 50. If the entry code is authenticated by a keyless entry code management part 52, its result is sent to the vehicle control part 38. Thus, the vehicle control part 38 instructs a door lock part 54 to lock or unlock.

Further, when the owner of the first cellular phone 1 performs an engine start operation with the vehicle operating part 40, an engine lock is unlocked to enable engine start by communication between the keyless entry communication parts 28 and 50. Specifically, since the owner of the first cellular phone 1 is on the driver's seat of the vehicle 3 in this case, the keyless entry communication part 28 and the keyless entry communication part 50 can communicate with each other. Then, responding to the engine start operation, communication is performed between them. When the keyless entry code management part 52 authenticates the entry code in the keyless entry code storage part 30, its result is sent to the vehicle control part 38. Responding to this, the vehicle control part 38 unlocks an engine lock part 56 so as to enable engine start.

Note that the entry code in the keyless entry code storage part 30 of the first cellular phone 1 can be transmitted via the first cellular control part 6 from the first cellular short-range communication part 20 to the vehicle short-range communication part 48 of the vehicle 3 as described above. This is effective in the case where the auxiliary power source 26 is exhausted or the like. In this case, the vehicle control part 38 sends the entry code received by the vehicle short-range communication part 48 to the keyless entry code management part 52 so that the entry code is authenticated. Then, based on the result, the vehicle control part 38 instructs the door lock part 54 to lock or unlock.

In the case of the above description, the entry code in the keyless entry code storage part 30 is transmitted from the first cellular short-range communication part 20 to the vehicle short-range communication part 48 of the vehicle 3 via the first cellular control part 6 also when the engine start operation is performed. Further, when the keyless entry code management part 52 authenticates the entry code, its result is sent to the vehicle control part 38. Responding to this, the vehicle control part 38 unlocks the engine lock part 56 so as to enable engine start.

The above description is the case where the owner of the first cellular phone 1 is also the owner of the vehicle 3. Next, the case where the owner of the second cellular phone 2 owns the vehicle 3 while the first cellular phone 1 is owned by a substitute drive service agent will be described. Note that the second cellular phone 2 is similar to the first cellular phone 1 and has all the structural elements including the keyless entry code storage part, the keyless entry communication parts and the like although they are omitted in FIG. 1 as described above.

The above-described situation occurs, for example, when the owner of the vehicle 3 is drunken and requests the substitute drive service agent to drive the vehicle 3 to his or her home. In this case, the owner of the vehicle 3 who is also the owner of the second cellular phone 2 transmits a temporary entry code of the vehicle 3 from the second telephone communication part 34 to the first telephone communication part 18 of the substitute drive service agent via the telephone line. Thus, the keyless entry code storage part 30 of the first cellular phone 1 stores the received temporary entry code. After that, similarly to the above-description, the first cellular phone 1 can perform unlock of the door lock of the vehicle 3 and unlock of the engine lock. Therefore, the substitute drive service agent can drive the vehicle 3 to the party site or the like where the owner of the vehicle exists, pick up him or her, and drive the vehicle 3 to his or her home. Note that the temporary entry code is valid only in the day when the substitute drive service is requested and becomes invalid after that. Details of transmission of the temporary entry code, or the like will be described later.

The parking lot 4 has a parking lot control part 58 constituted of a computer for controlling the entire parking lot and performs the control by software stored in a storage part 60. The storage part 60 also stores various data temporarily which are necessary for control of the parking lot 4.

The parking lot 4 also has a parking lot first short-range communication part 62 and a parking lot second short-range communication part 64 which are installed at different places in the parking lot. Note that the parking lot 4 may have a third or more short-range communication parts if necessary for securing communication area in the parking lot. FIG. 1 illustrates two short-range communication parts for simplification.

The plurality of short-range communication parts 62 and 64 in the parking lot 4 secure communication areas in part, and the first cellular short-range communication part 20 detects which one of the short-range communication parts can communicate, so that the parking lot control part 58 decides where the first cellular phone 1 exists in the parking lot 4. Further, if a radio wave from the first cellular short-range communication part 20 is received simultaneously by the parking lot first short-range communication part 62 and the second cellular short-range communication part 64, for example, the parking lot control part 58 can locate a position of the first cellular phone 1 more correctly based on triangulation point communication. Thus, even if the first cellular phone 1 is out of area for satellite radio wave like inside the building of the parking lot 4 so that the GPS 16 does not work, the position of the first cellular phone 1 can be detected. Note that the position of the first cellular phone 1 detected by the parking lot control part 58 is sent from the nearest parking lot short-range communication part to the first cellular short-range communication part 20.

In the same manner for the parking position of the vehicle 3, the parking lot control part 58 detects it by communication between the vehicle short-range communication part 48 and the parking lot second short-range communication part 64 or the like if the GPS part 46 of the vehicle 3 does not work, so that the detected position is transmitted to the first cellular short-range communication part 20.

As described above, the first cellular phone 1 can locate its own position by its own GPS part 16 and can obtain the positional information the vehicle 3 detected by the GPS part 46 of the vehicle 3 via the first cellular short-range communication part 20. Therefore, even if the substitute drive service agent does not know the position of the vehicle 3, he or she can reach the vehicle 3 by displaying a positional relationship between them on the display part 14.

Further, even if the GPS parts 16 and 46 do not work, information of the own position and the position of the vehicle 3 can be received by the first cellular short-range communication part 20 from the parking lot control part 58. Therefore, in the same manner, the positional relationship between them can be display on the display part 14, so as to reach the vehicle 3 easily.

Note that the transmitted positional information of the vehicle 3 cannot be received by the first cellular short-range communication part 20 unless the own entry code or the temporary entry code that is received from the owner of the vehicle 3 is stored in the keyless entry code storage part 30 of the first cellular phone 1. Therefore, the position of the vehicle 3 is not transmitted to a third party.

Figure 2:
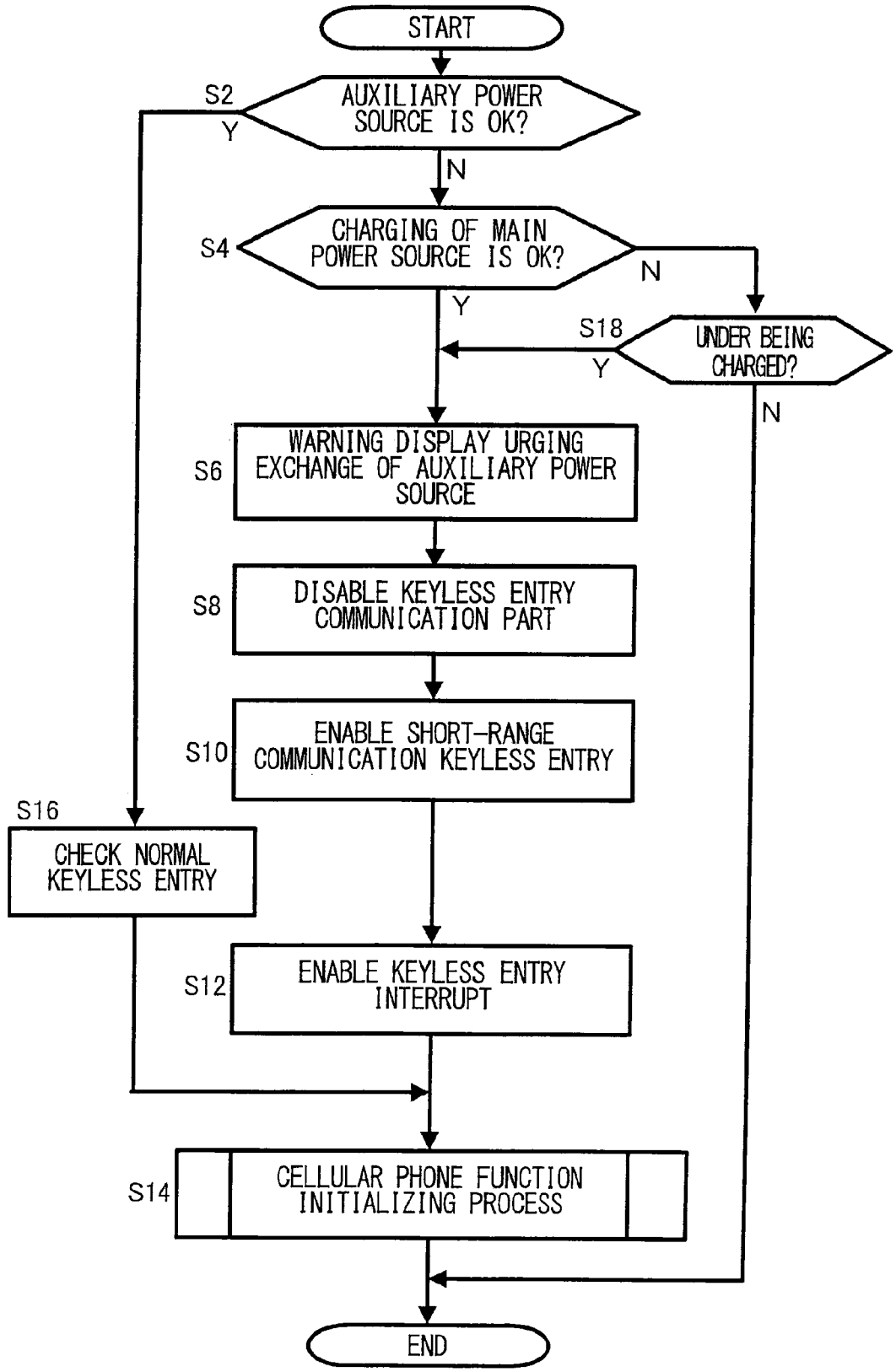
FIG. 2 is a basic flowchart of a function of a cellular control part in Example 1 illustrated in FIG. 1.

FIG. 2 is a basic flowchart of a function of the first cellular control part 6 in Example 1 illustrated in FIG. 1, which is started by connection of the main power source 24 to the first cellular phone 1, start of charging of the main power source 24 is started, or connection of the auxiliary power source 26. When the process flow starts, it is first checked in Step S2 whether or not the auxiliary power source 26 is OK. The level to be decided that the auxiliary power source 26 is not OK should be a level just before a limit at which exhaustion of the auxiliary power source 26 proceeds so that the backup of the storage part 12 and the keyless entry code storage part 30 cannot be secured any more if the power supply to the keyless entry communication part 28 is continued. In other words, the level should be a level at which the backup itself can be performed for the time being as long as the power supply to the keyless entry communication part 28 is not performed.

If the auxiliary power source 26 is not OK in Step S2, the process flow goes to Step S4 in which it is checked whether or not charging of the main power source 24 is OK. The level to be decided that charging of the main power source 24 is not OK should be a level at which minimum operation of the first cellular control part 6 itself can be performed, but the normal cellular phone operation cannot be performed, and therefore the cellular phone function should be stopped. If the charging of the main power source 24 is OK in Step S4, the process flow goes to Step S6, in which a warning display urging exchange of the auxiliary power source 26 is performed. Then, the process flow goes to Step S8 while continuing this display.

In Step S8, the function of the keyless entry communication part 28 is stopped so as to disable communication for preventing the auxiliary power source 26 from being further exhausted. Responding to this, the keyless entry communication by the first cellular short-range communication part 20 is enabled in Step S10. The keyless entry communication by the first cellular short-range communication part 20 is usually not performed, but this is performed only in the case where the process flow goes from Step S2 to Step S8.

This is because the first cellular short-range communication part 20 is supplied with electricity from the main power source 24. The main power source 24 is required to be charged frequently for supplying electricity for normal cellular phone function. If the charging is not performed, the entire cellular phone 1 becomes unable to work, and the first cellular short-range communication part 20 also becomes unable to work. Therefore, if the first cellular short-range communication part 20 is regularly used for the keyless entry function, the battery of the cellular phone 1 may be exhausted frequently, so that the keyless entry or other operations of the vehicle 3 cannot be performed. This is inconvenient and is also dangerous in a certain case. Therefore, the keyless entry operation is usually performed by the keyless entry communication part 28 that is supplied with electricity from the auxiliary power source 26 and works regardless of the charged state of the main power source 24 and an ON or OFF state thereof, and the keyless entry code storage part 30 that works together with the same.

However, the auxiliary power source 26 may also be exhausted by long term use, and therefore, the process flow from Step S2 to Step S10 is prepared as urgent means in that case. This is based on the precondition that when the auxiliary power source 26 is exhausted, there is low probability that the main power source 24 is in an insufficiently charged state at the same time.

When the keyless entry communication by the first cellular short-range communication part 20 becomes enabled in Step S10, the process flow goes to Step S12 in which a keyless entry interrupt as the first cellular control part 6 is enabled. This interrupt is related to the case where the telephone operating part 8 performs the keyless entry operation. In addition, this interrupt occurs also in the case where the vehicle control part 38 detects that an external unlock button outside the vehicle that is a part of the vehicle operating part 40 of the vehicle 3 is operated, and the vehicle short-range communication part 48 informs the first cellular short-range communication part 20 about the fact. Although the interrupt is enabled in Step S12, the interrupt to the first cellular control part 6 based on the operation is usually inhibited. Therefore, the keyless entry function based on the operation is performed by the keyless entry communication part 28.

Next, an initial process of the cellular phone function is performed in Step S14, and the process flow is finished. Note that if it is decided in Step S2 that the auxiliary power source 26 is OK, the first cellular phone control part 6 is not required to respond the keyless entry operation. Therefore, the process flow goes to Step S16 in which a normal keyless entry state by the keyless entry communication part 28 is checked to go to Step S14. This Step S16 is provided for checking every time upon connection of the main power source 24 to the first cellular phone 1, start of charging of the main power source 24, or connection of the auxiliary power source 26, whether or not the keyless entry communication part 28 works normally, and for disabling the keyless entry interrupt to the first cellular control part 6 if it has been enabled.

In addition, if the main power source 24 is not OK in Step S4, the process flow goes to Step S18 in which it is checked whether or not it is being charged. If it is being charged, the cellular phone 1 can work. Therefore, the process flow goes to Step S6 in which the operation in Step S6 and following steps is performed by electric power supplied from a charger. This operation can be performed in the case where the cellular phone 1 is being charged in the vehicle 3, for example.

On the other hand, it is not being charged in Step S18, the function of the cellular phone 1 cannot be performed. Therefore, the process flow is finished promptly. For instance, this case corresponds to the case where the exhausted auxiliary power source 26 is incorrectly connected and the main power source 24 is not charged, or the case where the auxiliary power source 26 is exhausted and an uncharged main power source 24 is connected. As a matter of course, if the first cellular control part 6 is not supplied with electricity, the process flow itself illustrated in FIG. 2 does not start.

Figure 3:
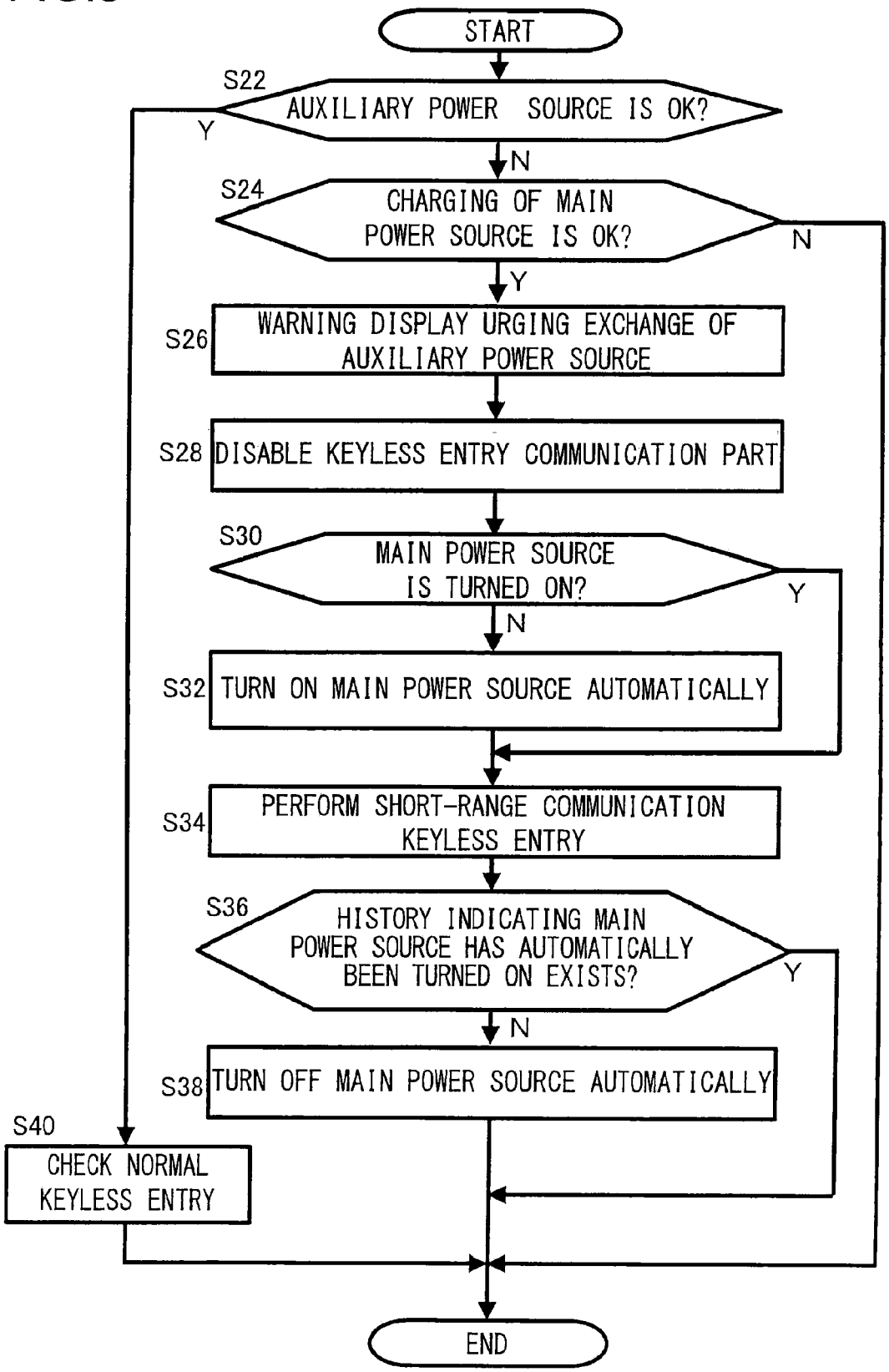
FIG. 3 is a flowchart illustrating a function when a keyless entry operation is performed in the cellular control part of Example 1 illustrated in FIG. 1.

FIG. 3 is a flowchart illustrating a function when the keyless entry operation is performed in the first cellular control part 6 of Example 1 illustrated in FIG. 1. The process flow starts when a keyless entry operation is performed by the telephone operating part 8, or when the vehicle control part 38 detects that an external unlock button outside the vehicle that is a part of the vehicle operating part 40 of the vehicle 3 is operated so that the keyless entry communication part 50 of the vehicle 3 informs the keyless entry communication part 28 of the first cellular phone 1 about the fact, or when the vehicle control part 38 detects that the external unlock button outside the vehicle that is a part of the vehicle operating part 40 of the vehicle 3 is operated so that the vehicle short-range communication part 48 informs the first cellular short-range communication part 20 about the fact.

Note that when the vehicle control part 38 detects the engine start operation by the vehicle operating part 40, the process flow illustrated in FIG. 3 starts similarly to the case where the operation of the unlock button is detected.

When the process flow starts, it is checked in Step S22 whether or not the auxiliary power source 26 is OK. If the auxiliary power source 26 is not OK, the process flow goes to Step S24 in which it is checked whether or not the charging of the main power source 24 is OK. If the charging of the main power source 24 is OK in Step S24, the process flow goes to Step S26 in which the warning display urging exchange of the auxiliary power source 26 is performed. Then, the process flow goes to Step S28 while continuing this display.

In Step S28, the function of the keyless entry communication part 28 is stopped so as to disable communication, and the process flow goes to Step S30. In Step S30, if the main power source 24 is not turned on, it is turned on in Step S32, and the process flow goes to Step S32. This is because if the main power source 24 is turned off, the first cellular short-range communication part 20 is not supplied with electricity so that the keyless entry process cannot be performed. On the other hand, if the main power source 24 is already turned on in Step S30, the process flow goes directly to Step S34.

In Step S34, the keyless entry process such as locking or unlocking of the door lock part 54, unlocking the engine lock part 56, and the like is performed based on communication by the first cellular short-range communication part 20.

Next, it is checked in Step S36 whether or not there is a history indicating that the main power source 24 has automatically been turned on in Step S32. If there is the history, the process flow goes to Step S38 in which the main power source 24 is automatically turned off, and the process flow is finished. This is for resetting the main power source 24 of the first cellular phone 1 that was automatically turned on for performing the keyless entry process, after finishing the process. On the other hand, if there is not the history indicating that the main power source has automatically been turned on in Step S36, it means that the main power source 24 of the first cellular phone 1 has been turned on from before detecting the keyless entry operation. Therefore, the main power source 24 is not turned off, and the process flow is finished.

Note that if it is decided that the auxiliary power source 26 is OK in Step S22, the first cellular phone control part 6 is not required to respond to the keyless entry operation. Therefore, the process flow goes to Step S40 in which a normal keyless entry state by the keyless entry communication part 28 is checked, and the process flow is finished. This Step S40 is provided for checking every time when the keyless entry operation can be performed whether or not the keyless entry communication part 28 works normally, and for disabling the keyless entry interrupt to the first cellular control part 6 if it is enabled.

In addition, if the charging of the main power source 24 is not OK in Step S24, the keyless entry cannot performed either by the auxiliary power source 26 or the main power source 24. Therefore, the process flow is finished promptly.

Figure 4:
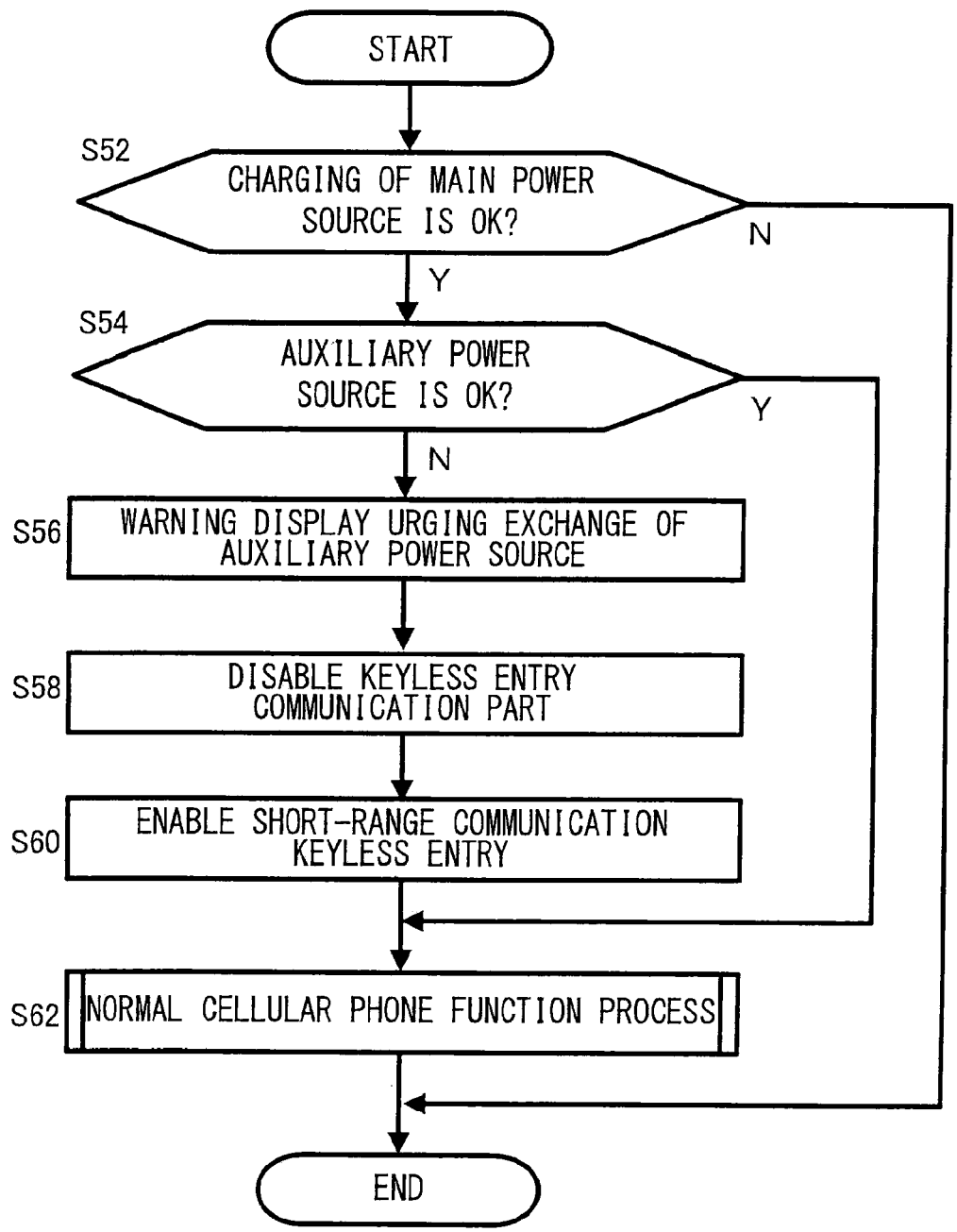
FIG. 4 is a flowchart illustrating a function of the cellular control part when a main power source of a cellular phone is switched on in Example 1 illustrated in FIG. 1.

FIG. 4 is a flowchart illustrating a function of the first cellular control part 6 when the main power source 24 of the first cellular phone 1 is turned on in Example 1 illustrated in FIG. 1. When the process flow starts, it is checked in Step S52 whether or not the charging of the main power source 24 is OK. If the charging is OK, the process flow goes to Step S54 in which it is checked whether or not the auxiliary power source 26 is OK. If the auxiliary power source 26 is not OK, the process flow goes to Step S56 in which the warning display urging exchange of the auxiliary power source 26 is performed. Then, the process flow goes to Step S58 while continuing this display.

In Step S58, the function of the keyless entry communication part 28 is stopped so as to disable communication for preventing the auxiliary power source 26 from being exhausted further. Responding to this, the keyless entry communication by the first cellular short-range communication part 20 is enabled in Step S60, and the process flow goes to a normal cellular phone function process in Step S62. Then, if the normal cellular phone function process is stopped, the process flow is finished.

Note that if it is decided in Step S54 that the auxiliary power source 26 is OK, the first cellular phone control part 6 is not required to respond to the keyless entry operation. Therefore, the process flow goes to Step S62 directly. In addition, if it is not detected in Step S52 that the charging of the main power source 24 is OK, the process flow is finished promptly.

As described above, every time when the main power source 24 of the first cellular phone 1 is turned on, it is checked whether or not the auxiliary power source 26 is OK, so that the situation in which the keyless entry cannot be performed by the auxiliary power source 26 can be proved in advance. In addition, if the auxiliary power source 26 is not OK, the function of the keyless entry is automatically switched from the keyless entry communication part 28 to the first cellular short-range communication part 20, so as to prevent the situation where the auxiliary power source 26 is further exhausted so that the storage part 12 cannot be backed up.

Figure 5:
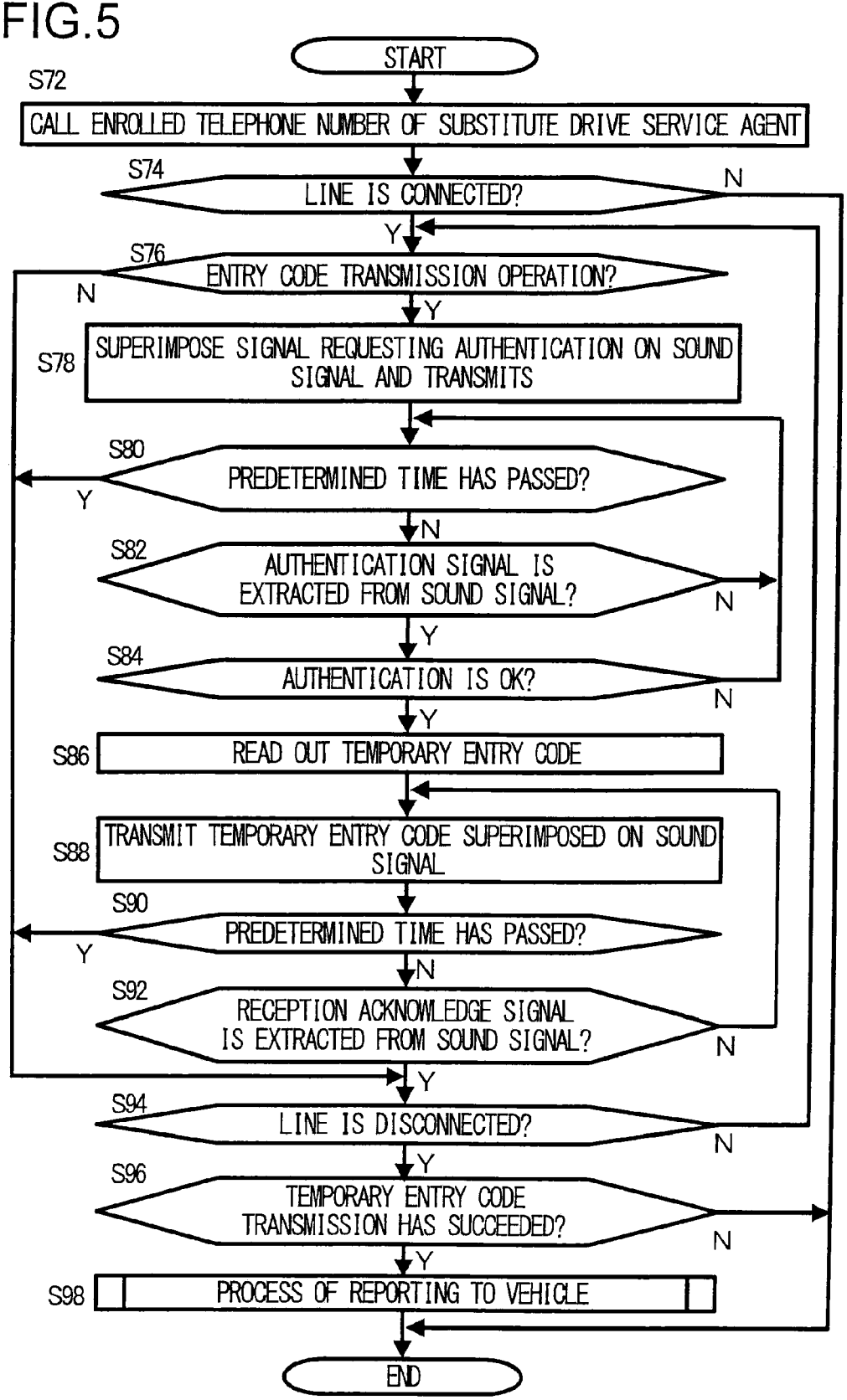
FIG. 5 is a flowchart illustrating a function of the cellular control part when a telephone call operation to a substitute drive service agent is performed in Example 1 illustrated in FIG. 1.

FIG. 5 is a flowchart illustrating a function of the first cellular control part 6 when the telephone call operation to the substitute drive service agent that is enrolled in advance is performed by the telephone operating part 8 in Example 1 illustrated in FIG. 1. When the process flow starts, a call operation to a telephone number of the enrolled substitute drive service agent is performed in Step S72, and it is checked in Step S74 whether or not the line is connected.

If the line connection is confirmed, the process flow goes to Step S76 in which it is checked whether or not the operation for transmitting the entry code was performed by the telephone operating part 8. If it is checked that the operation was performed, the process flow goes to Step S78 in which a signal requesting authentication is superimposed on a sound signal of the telephone and is transmitted, and then the process flow goes to Step S80. In Step S80, it is checked whether or not a predetermined time has passed from the transmission of the signal requesting authentication. If the predetermined time has not passed yet, the process flow goes to Step S82 in which it is checked whether or not the authentication signal that is superimposed on a sound signal and is returned responding to the request has been extracted.

After the authentication return signal is extracted from the sound signal in Step S82, the process flow goes to Step S84 in which the extracted signal is compared with a reference data so as to check whether or not the authentication result is OK. Then, if the authentication result is OK, the process flow goes to Step S86. On the other hand, if the authentication return signal cannot be extracted in Step S82 or if the authentication is not OK in Step S84, the process flow goes back to Step S80. After that, the process from Step S80 to Step S84 is repeated until the predetermined time passes while waiting that the authentication becomes OK.

When the authentication becomes OK, the temporary entry code is read out from the keyless entry code storage part 30 in Step S86, and it is superimposed on the sound signal in Step S88 and is transmitted to the telephone of the substitute drive service agent. Then, it is checked in Step S90 whether or not a predetermined time has passed after the transmission. If the predetermined time has not passed yet, it is checked in Step S92 whether or not an acknowledge signal of reception of the temporary entry code has been extracted from a sound signal received from the telephone of the substitute drive service agent. Then, if the extraction has succeeded, the process flow goes to Step S94. If the extraction has failed, the process flow goes back to Step S88 in which the temporary entry code is retransmitted. After that, the process from Step S88 to Step S92 is repeated until a predetermined time passes while waiting that the reception acknowledge signal is extracted.

If the reception acknowledge signal is extracted in Step S92, it means that the temporary entry code has securely been transmitted to the substitute drive service agent. Therefore, the process flow goes to Step S94 in which it is checked whether or not a line disconnection operation was performed. Then, if the line is disconnected, the process flow goes to Step S96. If the line disconnection operation is not detected in Step S94, the process flow goes back to Step S76. After that, the process from Step S76 to Step S94 is repeated.

Note that if a predetermined time has passed in Step S80 or in Step S90, the process flow goes to Step S94 in which it is checked whether or not the operation of disconnecting the line and finishing the process flow was performed. If the line disconnection is not detected in Step S94, the process flow goes back to Step S76 so that the process can restart from the entry code transmission operation.

In Step S96, it is checked whether or not the transmission of the temporary entry code performed in Step S76 to Step S94 has succeeded. If it has succeeded, the process flow goes to Step S98 in which the fact is reported to the vehicle 3, and the process flow is finished.

The vehicle 3 illustrated in FIG. 1 is equipped with a telephone communication part (not shown), which can communicate with the first telephone communication part 18 or the second telephone communication part 34 via a telephone line. The telephone communication part of the vehicle 3 is connected to the vehicle control part 38 similarly to the first telephone communication part 18 that is connected to the first cellular control part 6, and it can transmit information communicated by the telephone communication part of the vehicle 3 to individual parts of the vehicle 3 if necessary. The report to the vehicle 3 about the temporary entry code transmission success in Step S98 is usually performed by such digital signal communication via the telephone line. However, if the short-range communication is available, the report is performed by transmitting the digital signal from the first cellular short-range communication part 20 or the second cellular short-range communication part 36 to the vehicle short-range communication part 48.

Note that if the communication to the vehicle 3 cannot be established in the predetermined time so that the fact that the substitute drive service is requested cannot be reported to the vehicle 3, the reporting process is once stopped in Step S98, and the process flow is finished. This case occurs in the case where the vehicle 3 is placed in a parking lot outside the wireless communication area.

If the temporary entry code transmission success cannot be confirmed in Step S96, the process flow is finished as it is. This corresponds to the case where the line is disconnected in Step S76, Step S80, or Step S90 to Step S94. Note that the process flow is finished promptly also in the case where the line cannot be connected in Step S74.

In the above-described Example 1, the entry code is superimposed on the sound signal and is handled as a sound data when the entry code is transmitted and received. This is for preventing the vehicle from being stolen due to a leakage or forgery of the entry code, by setting the precondition that the substitute drive service should be requested by sound communication with the substitute drive service agent, so that the entry code can be transmitted and received only if the sound communication line is connected. In addition, with this structure, the entry code can be transmitted and received in parallel with the sound communication with the substitute drive service agent.

However, the present invention is not limited to this embodiment. It is possible to adopt a structure in which the entry code is communicated by a data communication system such as the Internet other than the sound communication line. In this case, in order to prevent a leakage or forgery of the entry code, an appropriate security countermeasure should be considered when transmitting and receiving the entry code.

Figure 6:
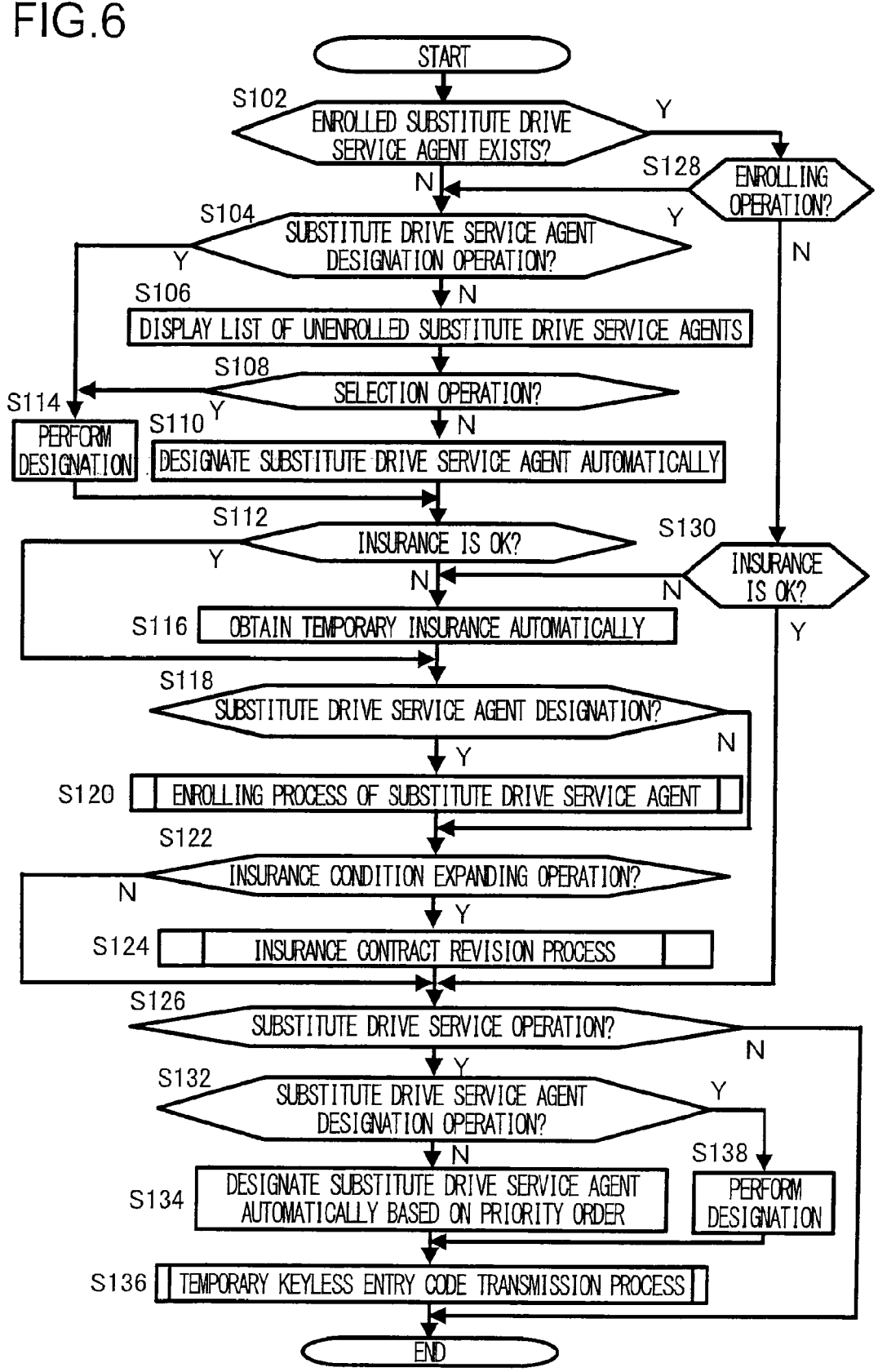
FIG. 6 is a flowchart illustrating a function of the cellular control part from enrollment of the substitute drive service agent performed as a precondition of the entry code transmission to the substitute drive service agent to the entry code transmission illustrated in FIG. 5.

FIG. 6 is a flowchart illustrating a function of the first cellular control part 6 concerning the process from the enrollment of the substitute drive service agent performed as the precondition of the entry code transmission to the substitute drive service agent in FIG. 5 to the entry code transmission in FIG. 5. The process starts when the telephone operating part 8 performs the substitute drive service operation or the enrollment operation of the substitute drive service agent. Note that this substitute drive service operation is constituted so as to support not only requesting for the substitute drive service to the substitute drive service agent but also private lending of the vehicle to a friend or other person.

When the process flow starts, it is checked in Step S102 whether or not there is an enrolled substitute drive service agent. If there is no enrolled substitute drive service agent, the process flow goes to Step S104. This is because enrolling of a substitute drive service agent is first required if there is no enrolled substitute drive service agent even in the case where process flow starts for the substitute drive service operation.

In Step S104, it is checked whether or not there is an input operation specifying a substitute drive service agent to be enrolled. If the operation is not detected in a predetermined time, the process flow goes to Step S106 in which a list of substitute drive service agents which are not enrolled yet is displayed. This list is provided from a substitute drive service group, including address, age, gender and the like together with a profile of the substitute drive service agent, which is provided to the first cellular phone 1 via the Internet or the like in advance.

While continuing the list display, the process flow goes to Step S108 in which it is checked whether or not an operation of selecting a substitute drive service agent to be enrolled from the list display has been performed in a predetermined time from start of the list display. If the operation is not detected in a predetermined time, the process flow goes to Step S110 in which a substitute drive service agent to be enrolled is selected from the list display in accordance with a predetermined rule as a substitute drive service agent automatic designation process, and the process flow goes to Step S112.

As described above, if there is no enrolled substitute drive service agent and if there is no operation in a predetermined time after the process flow starts, a substitute drive service agent to be enrolled is automatically designated, and the process flow goes to Step S112. Therefore, if it is not important who should be enrolled as a substitute drive service agent, even a user who does not know the complicated procedure can proceed the automatic enrollment of a substitute drive service agent that is necessary for requesting the substitute drive service.

On the other hand, if there is an input operation specifying a substitute drive service agent to be enrolled in Step S104, the process flow goes to Step S114 in which the substitute drive service agent is designated as specified as the input, and the process flow goes to Step S112. In addition, also in the case where the operation of selecting from the list display is detected in Step S108, the process flow goes to Step S114 in which the substitute drive service agent to be enrolled is designated as selected, and the process flow goes to Step S112.

In Step S112, it is checked whether or not the substitute drive service agent who is decided to be enrolled in Step S110 or Step S114 has a problem for driving the vehicle with respect to car insurance. Then, if it is detected in Step S112 that there is a problem such that the driver to be enrolled cannot support an accident because of an escape clause of the car insurance, the process flow goes to Step S116 in which a procedure of obtaining a temporary insurance is performed automatically, and the process flow goes to Step S118. This temporary insurance is for covering the enrolled substitute drive service agent for a short term of three days, for example.

On the other hand, if it is confirmed in Step S112 that the insurance is OK, the process flow goes to Step S118 directly.

In Step S118, it is checked whether or not a new substitute drive service agent to be enrolled is designated in Step S114 or Step S110. If it is true, the process flow goes to Step S120. In Step S120, the enrolling process of the substitute drive service agent decided to be enrolled is performed, and the process flow goes to Step S122. On the other hand, if a new designation of a substitute drive service agent is not detected in Step S118, the process flow goes to Step S122 directly. The reason why such a case occurs will be described later.

In Step S122, it is checked whether or not the operation of expanding a range of the condition to be covered by the car insurance is performed. If it is true, the process flow goes to Step S124 in which insurance contract revision process is performed, and the process flow goes to Step S126. On the other hand, if the insurance condition expansion operation is not detected in Step S122, the process flow goes to Step S126 directly.

Here, the above-described insurance condition expansion operation will be further described. If it is detected in Step S112 that the insurance is not OK, the process of obtaining the temporary insurance is performed as an emergency measure in Step S116. In contrast, detected in Step S122 is the insurance condition expansion operation such as cancelling restriction to families in a normal insurance contract, for example. The process of obtaining the temporary insurance is automatically performed, while the process of expanding a normal insurance condition is performed by manual operation.

Note that if it is detected in Step S102 that there is an enrolled substitute drive service agent, the process flow goes to Step S128 in which it is checked whether or not the process flow has started by the enrollment operation of the substitute drive service agent. If it is true, the process flow goes to Step S104 in which a process of enrolling a new substitute drive service agent is performed in accordance with the process flow described above.

On the other hand, if it is detected in Step S128 that the process flow in FIG. 6 is not started by the enrollment operation of the substitute drive service agent, it corresponds to the case where the process flow is started by the substitute drive service operation and there is an enrolled substitute drive service agent. In this case, the process flow goes basically to Step S126, but there is Step S130 before that, in which it is checked whether or not the car insurance is OK. If it is OK, the process flow goes to Step S126 directly. If there is a problem, the process flow goes to Step S116.

Step S130 is provided because there is the case where even if the enrolled substitute drive service agent is supposed in the substitute drive service operation, the insurance condition expansion operation supposing the driver was not performed in the past, and the temporary insurance that was obtained automatically is expired. Therefore, in this case, similarly to the above description, the temporary insurance is obtained again in Step S116 first, and the process flow goes to Step S122 in which the insurance condition expansion operation is checked. Note that this case does not correspond to a new designation of the substitute drive service agent, so Step S120 is skipped.

In Step S126, it is checked whether or not the process flow in FIG. 6 is started by the substitute drive service operation. If it is true, the process flow goes to Step S132, in which it is checked whether or not there is an operation of designating a substitute drive service agent. The contents of Step S132 is to display a list of a plurality of enrolled substitute drive service agents if there are, and to check whether or not the operation of selecting a substitute drive service agent from them has been performed in a predetermined time after the display. If there is no designation operation in a predetermined time from start of the list display, the process flow goes to Step S134 in which a substitute drive service agent is designated automatically based on a predetermined priority order, and the process flow goes to Step S136. On the other hand, if it is detected in Step S132 that there is a designation operation, the process flow goes to Step S138 in which designation is performed as the operation, and the process flow goes to Step S136. Note that if there is one enrolled substitute drive service agent, the process flow goes from Step S132 to Step S134 promptly, in which the automatic designation process is performed, and the process flow goes to Step S136.

In Step S136, a process of transmitting the temporary keyless entry code to the designated substitute drive service agent is performed, and the process flow is finished. A detail of Step S136 is as described above with reference to FIG. 5.

As described above, according to the process flow in FIG. 6, even if the substitute drive service agent simply performs the substitute drive service operation in an unenrolled state and then performs no operation, the process of automatic designation of the substitute drive service agent is performed in Step S110, the process of automatically obtaining the temporary car insurance is performed in Step S116, the substitute drive service agent is automatically enrolled in Step S120, and further the substitute drive service agent is automatically designated in Step S134 and the temporary entry code of the designated substitute drive service agent is transmitted in Step S136. Therefore, even if the user does not know a substitute drive service agent or a detailed operation procedure for requesting the substitute drive service, the user can easily request the substitute drive service. This is good in the case where the user has to request the substitute drive service in haste after drinking.

The function according to the process flow illustrated in FIG. 6 can support not only the above-described case but also a manual operation based on various requests from the user.

Figure 7:
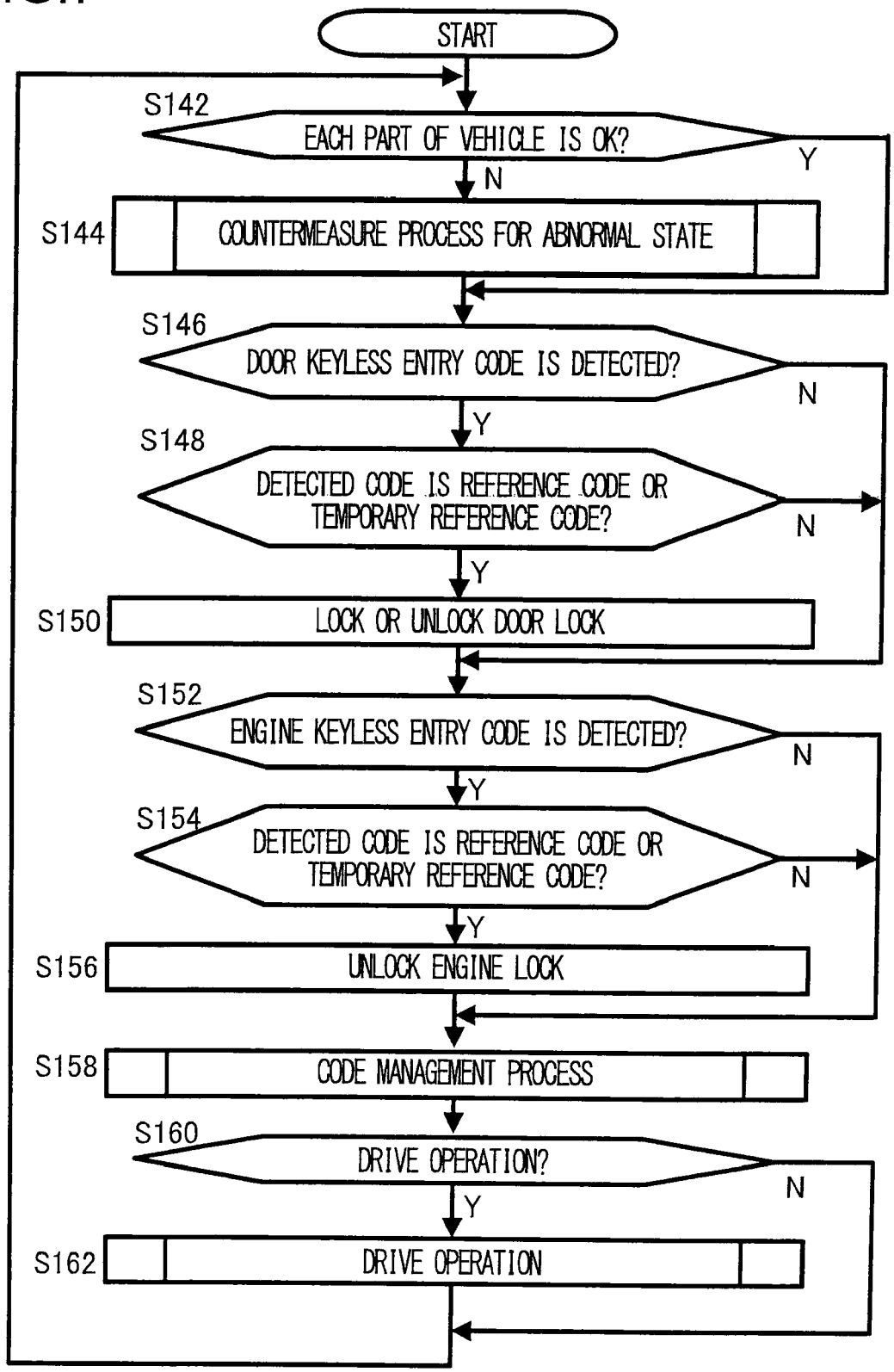
FIG. 7 is a basic flowchart illustrating an operation of the vehicle control part illustrated in FIG. 1.

FIG. 7 is a basic flowchart illustrating an operation of the vehicle control part 38 of the vehicle 3 illustrated in FIG. 1, and the process flow starts when electricity is supplied from the battery of the vehicle 3. When the process flow starts, it is checked in Step S142 whether or not each part of the vehicle 3 has a problem. If there is a problem, a countermeasure process in Step S144 is performed. When the countermeasure process is finished, the process flow goes to Step S146. In addition, if it is checked in Step S142 that each part of the vehicle 3 is OK, the process flow goes to Step S146 directly.

In Step S146, the vehicle control part 38 checks whether or not a keyless entry code signal for opening or closing the door is detected. If it is detected, the process flow goes to Step S148 for authentication, in which the keyless entry code management part 52 checks whether or not the detected code matches a reference code or a temporary reference code stored in the keyless entry code management part 52. If the detection result matches either one of them, i.e., the authentication is OK, the process flow goes to Step S150 in which the door lock part 54 is unlocked or locked. Then, the process flow goes to Step S152. In contrast, if there is not detection in Step S146, or if the authentication of the detection result is failed in Step S148, the process flow goes to Step S152 directly.

Here, the "reference code" corresponds to the entry code transmitted from the owner of the vehicle 3 and is an entry code to be referred to stored in the vehicle 3 for authentication. On the other hand, the "temporary reference code" corresponds to the temporary entry code transmitted from the substitute drive service agent or a lender of the vehicle and is a temporary entry code to be referred to, which is stored in the vehicle 3 for authentication. The reference code and the temporary reference code are frequently updated by different management procedures and managed with the update date. A detail thereof will be described later.

In Step S152, it is checked whether or not a keyless entry code signal for unlock the engine is detected. If the signal is detected, the process flow goes to Step S154 for authentication, in which the keyless entry code management part 52 checks whether or not the detected code matches the reference code or the temporary reference code stored in the keyless entry code management part 52. If the detection result matches either one of them, i.e., the authentication is OK, the process flow goes to Step S156 in which the engine lock part 56 is unlocked. Then, the process flow goes to Step S158. In contrast, if there is no detection in Step S152, or if the authentication of the detection result is failed in Step S154, the process flow goes to Step S158 directly.

In Step S158, the code management process is performed. This is a process of changing the entry code in association with the cellular phone so as to prevent a theft of the vehicle 3 due to leakage of the entry code. A detail thereof will be described later.

Next, in Step S160, it is detected whether or not drive operation is performed. If the operation is detected, the process flow goes to Step S162 in which a drive process is performed as the operation, and the process flow goes back to Step S142. On the other hand, if the drive operation is not detected in Step S160, the process flow goes back to Step S142 directly.

After that, the process from Step S142 to Step S162 is repeated so as to respond various situations about the vehicle 3.

Figure 8:
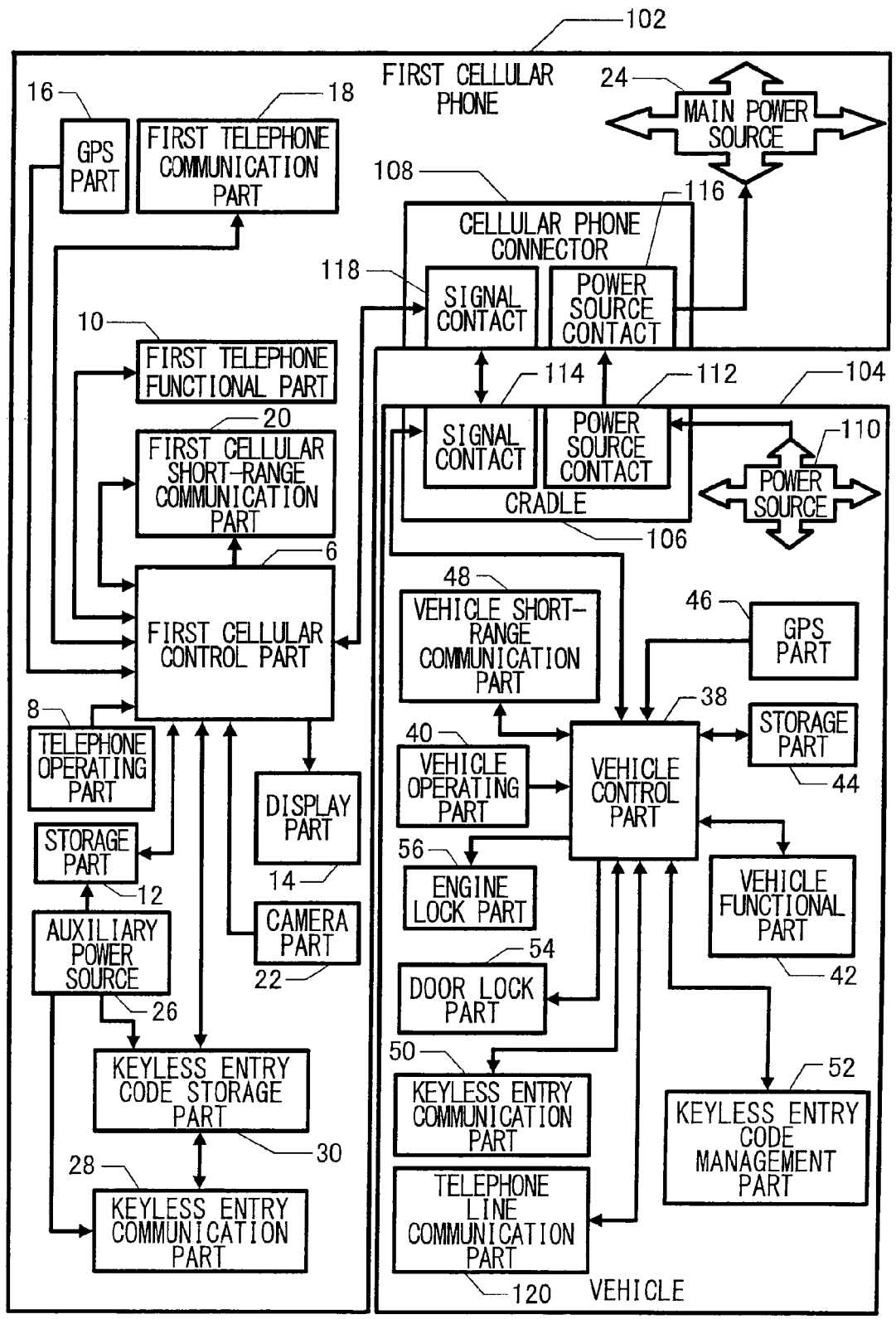
FIG. 8 is a block diagram illustrating Example 2 of the keyless entry system according to the embodiment of the present invention.

FIG. 8 is a block diagram illustrating Example 2 of the keyless entry system according to the embodiment of the present invention. Example 2 has basically the same structure as Example 1 illustrated in FIG. 1 but is additionally provided with the structure for charging a first cellular phone 102 from a vehicle 104 and for performing signal communication between them via a cellular phone connector 108 when the first cellular phone 102 is placed on a cradle 106 of the vehicle 104. Hereinafter, the additional structure will mainly be described in Example 2, and the same part as in Example 1 is denoted by the same numeral so that description thereof will be omitted.

In addition, the second cellular phone 2 and the parking lot 4 are not illustrated in Example 2 of FIG. 8 unlike in FIG. 1. They are merely omitted for simplification, and Example 2 is also constituted as a system including the second cellular phone 2 and the parking lot 4 similarly to Example 1. In this point, Example 2 is not different from Example 1. In addition, a symbol indicating the wireless communication is also omitted in FIG. 8. However, Example 2 is not different from Example 1 concerning the wireless communication between the first cellular short-range communication part 20 and the vehicle short-range communication part 48, the wireless communication between the keyless entry communication part 28 of the first cellular phone 102 and the keyless entry communication part 50 of the vehicle 104, and the like.

In FIG. 8, a power source 110 of the vehicle 104 is provided for supplying electricity to each part of the vehicle, and the vehicle 3 of Example 1 also has the same although the description is omitted. The cradle 106 is designed to support the bottom of the first cellular phone 102 and has a power source contact 112 and a signal contact 114. The power source contact 112 supplies electric power for charging from the power source 110 externally. In addition, the signal contact 114 is connected to the vehicle control part 38 so as to be an interface for communicating a signal externally.

The cellular phone connector 108 is provided to the bottom of the first cellular phone 102 and includes a power source contact 116 which contacts with the power source contact 112 of the cradle 106 and a signal contact 118 which contacts with the signal contact 114 of the cradle 106 when the first cellular phone 102 is placed on the cradle 106. The power source contact 116 is connected to the main power source 24 so as to be supplied with electric power from the vehicle 104 and to charge the main power source 24. In addition, the signal contact 118 is connected to the first cellular control part 6 so as to be an interface for external signal communication.

Between the signal contact 114 of the cradle 106 and the signal contact 118 of the cellular phone connector 108, various information can be exchanged between the first cellular phone 102 and the vehicle 104. For instance, image information taken by the camera part 22 and stored in the storage part 12 can be moved or copied to the storage part 44 of the vehicle 104 having larger capacity than the storage part 12. The image information supplied to the storage part 44 in this way can be viewed on a car navigation screen (not shown) mounted on the vehicle 104. In addition, the image information stored in the storage part 12 can be viewed directly on the car navigation screen. Further, sightseeing information or the like obtained by the first cellular phone 102 via the Internet may be sent to the vehicle 104 so that the destination can be set in the car navigation.

Further, every time when the first cellular phone 102 is placed on the cradle 106 of the vehicle 104 for charging, communication for updating the keyless entry code is performed between the signal contact 114 and the signal contact 118 as a countermeasure against a leakage or forgery of the keyless entry code. A detail thereof will be described later.

Note that the cradle 106 and the cellular phone connector 108 constitute a contact system in Example 2 described above, but they may constitute non-contact system utilizing power transmission with electromagnetic induction and signal transmission with weak radio wave. In the case of the non-contact system too, the first cellular phone 102 is designed to be placed on the cradle 106.

In addition, Example 2 illustrated in FIG. 8 includes a telephone line communication part 120. This has a structure similar to the first telephone functional part 10 and the first telephone communication part 18 in the first cellular phone 102, so that the wireless communication can be performed with the first cellular phone 102 via the telephone line. The telephone line communication part 120 can also perform voice communication as a vehicle telephone, but the main purpose of the structure is to perform the data communication for the keyless entry code transmission to the first cellular phone 102 and an access to the Internet. Such the telephone line communication part 120 is also provided in Example 1 of FIG. 1, but the illustration thereof is omitted in FIG. 1.

Note that the basic flowchart of the vehicle illustrated in FIG. 7 can commonly be applied to the vehicle control part 38 of the vehicle 104 in Example 2 described above.

Figure 9:
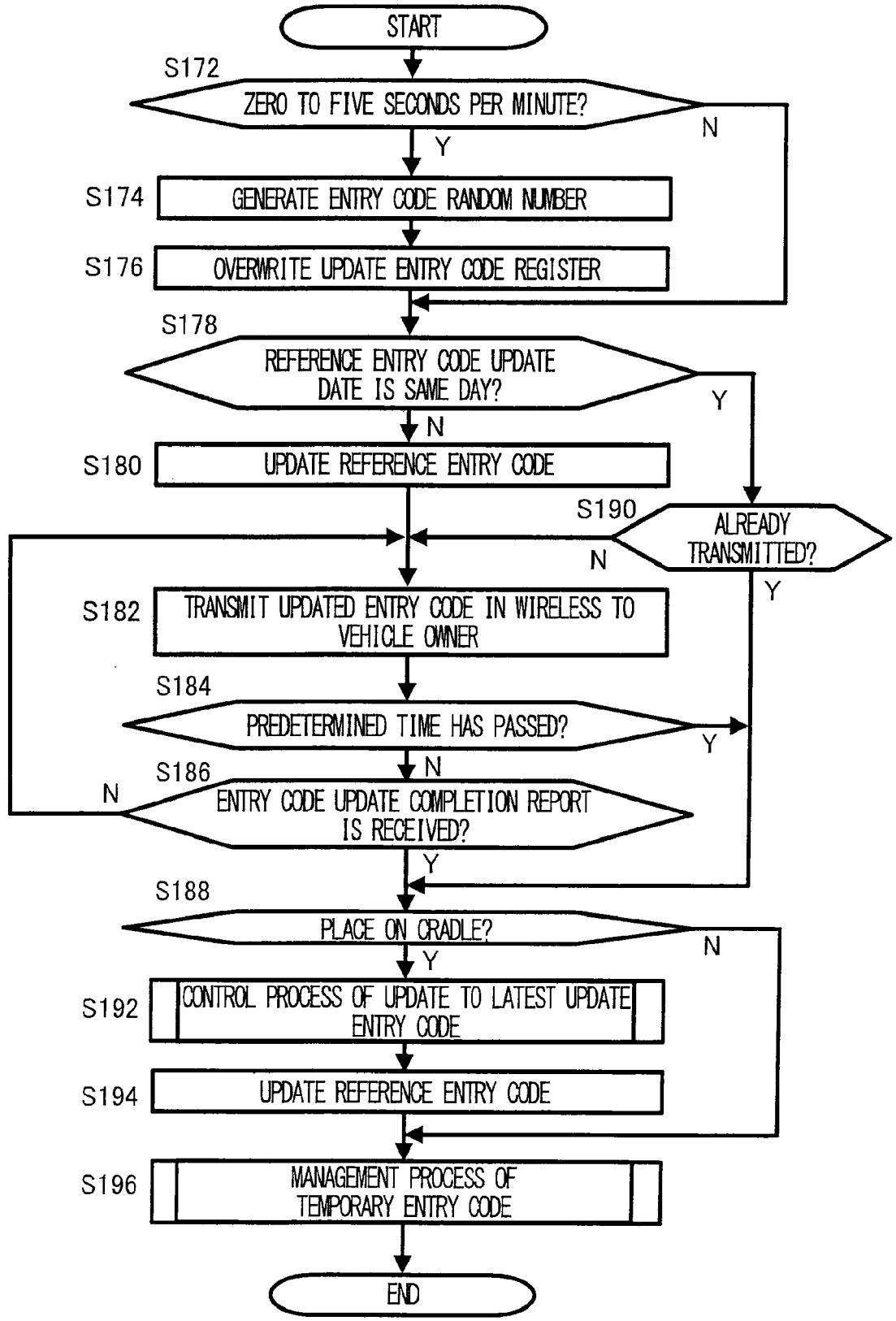
FIG. 9 is a flowchart illustrating a detail of a code management process in Step S158 of FIG. 7, which can be applied to each of Example 1 and Example 2.

FIG. 9 is a flowchart illustrating a detail of the code management process in Step S158 of FIG. 7 and can be applied to each of Example 1 illustrated in FIG. 1 and Example 2 illustrated in FIG. 2. Note that a part of the functions about the placement on the cradle is unique to Example 2, and other processes are simply skipped. Therefore, the functions may also be applied to Example 1 as they are, though there is redundancy. Alternatively, the redundant steps may be eliminated if necessary for applying to Example 1.

When the process flow starts, it is checked whether or not the time when the code management process has started is within the range from zero to five seconds in every minute based on the clock function incorporated in the vehicle control part 38. If it is true, an entry code random number is generated in Step S174, an update entry code register is overwritten based on its result in Step S176, and the process flow goes to Step S178. On the other hand, if it is not true in Step S172, the process flow goes to Step S178 directly.

Note that the process flow in FIG. 9 is a part of the process flow illustrated in FIG. 7. Since the process flow illustrated in FIG. 7 is repeated, it passes through Step S172 described above every time. The probability that the time on this occasion is in the range from zero to five seconds in every minute is $\frac{1}{12}$. Supposing that the frequency of passing through Step S172 is 12 times per minute, the process flow goes from Step S172 to Step S174 once every minute as the average. Therefore, the update entry code register is rewritten in Step S176 once per minute as an average based on the random number. As to the process flow illustrated in FIG. 7, if there is the process in Step S144 or Step S162, the frequency of passing through the code management in Step S158 is decreased, but it is no problem because it is not necessary to guard against theft or the like by updating the entry code while such the process is performed. On the contrary, if the vehicle is parked and there is no process, the process in Step S158 is repeated at high frequency. Therefore, rewriting of the communication entry code register in Step S176 of FIG. 9 is also performed at high frequency.

In Step S178, it is checked whether or not the date of the update of the reference code is the same day. If it is not the same day, the process flow goes to Step S180. This corresponds to the case where the reference code is the old one that was updated on the previous day or before.

In Step S180, a latest update entry code is read from the update entry code register, and a reference entry code stored in the keyless entry code management part 52 is updated. Next, in Step S182, the same data as the updated reference entry code is transmitted by wireless to the cellular phone of the vehicle owner as the update entry code. This transmission is first tried by the vehicle short-range wireless communication part 48. If it failed, the transmission is performed by the telephone line communication part. Then, in Step S184, it is checked whether or not a predetermined time has passed after the transmission. If it has not passed, it is checked in Step S186 whether or not the report indicating that the entry code update had finished has been received from the cellular phone of the vehicle owner. The cellular phone performs automatically the process from the update to the transmission of the finish report based on the reception of the entry code. Therefore, the entry code update of the cellular phone is performed automatically without an operation of the owner.

If the reception of the update finish report is not confirmed in Step S186, the update entry code is retransmitted in Step S178. Hereinafter, the process from Step S182 to Step S186 is repeated until a predetermined time has passed while waiting reception of the update finish report. Then, reception of the update finish report is confirmed in Step S186, the process flow goes to Step S188. On the other hand, if it is checked in Step S184 that the reception of the update finish report is not confirmed in the predetermined time, the transmission is once stopped, and the process flow goes to Step S188.

In addition, if the date of the reference entry code update is the same day in Step S178, the process flow goes to Step S190 in which it is checked whether or not the same data as the reference entry code has been transmitted to the vehicle owner. Then, if it has been transmitted, the process flow goes to Step S188. In this way, every time when the date changes, the reference entry code is updated in Step S180, which is sent to the cellular phone. Note that if the data has not transmitted in Step S190, the process flow goes to Step S182 so as to perform the transmission. This is a countermeasure against the case where data transmission to the vehicle owner has failed just after the reference entry code update.

In Step S188, it is checked whether or not the cellular phone of the vehicle owner is placed on the cradle 106 of the vehicle 104. If it is true, the process flow goes to Step S192 in which update control process of the latest communication entry code is performed. If the cellular phone of the vehicle owner is placed on the cradle 106, the cellular phone functions as a drive under control of the vehicle control part 38 via the signal contacts 114 and 118. Therefore, transmission and confirmation of the update entry code to the cellular phone can be performed directly in real time in Step S192. Then, after finishing of the process in Step S192, the process flow goes to Step S194 in which the reference entry code stored in the keyless entry code management part 52 of the vehicle is updated corresponding to the above description, and the process flow goes to Step S196. On the other hand, if it is not detected in Step S188 that the cellular phone of the vehicle owner is placed on the cradle 106, the process flow goes to Step S196 directly. In this way, every time when the cellular phone of the vehicle owner is placed on the cradle 106 of the vehicle 104, update of the entry code in the cellular phone and update of the corresponding reference entry code in the vehicle are performed in Step S192 and Step S194.

In Step S196, the temporary entry code management process is performed. Step S178 to Step S194 are related to the entry code management for the keyless entry by the cellular phone of the vehicle owner. Step S196 is related to the temporary entry code management for the keyless entry by the cellular phone of the substitute drive service agent or the lender of the vehicle. A detail thereof will be described later.

Figure 10:
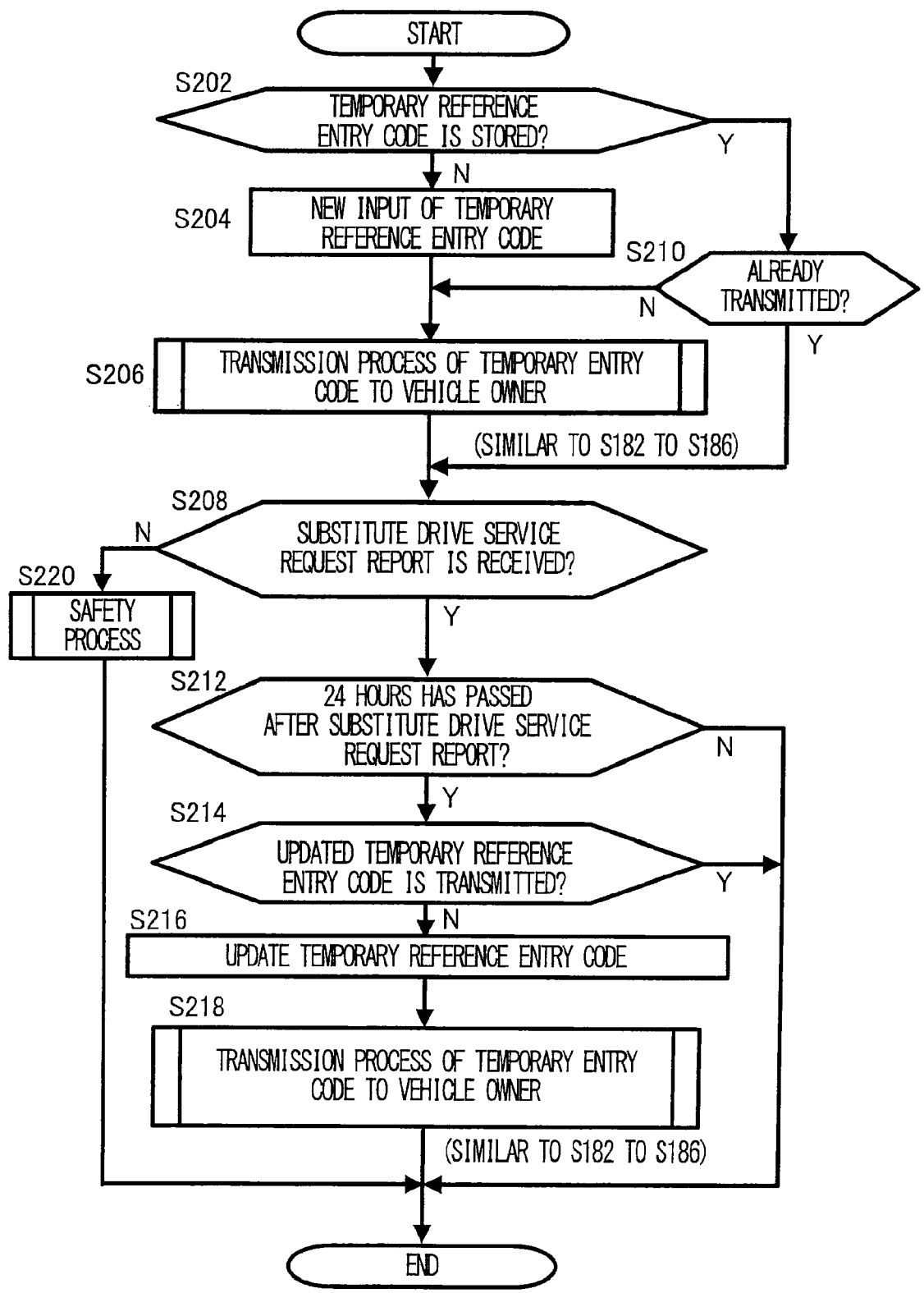
FIG. 10 is a flowchart illustrating a detail of a temporary entry code management process in Step S196 of FIG. 9.

FIG. 10 is a flowchart illustrating a detail of the temporary entry code management process in Step S196 of FIG. 9. When the process flow starts, it is checked in Step S202 whether or not the temporary reference entry code is stored in the keyless entry code management part 52 of the vehicle. Then, if it is not stored, data is read from the update entry code register and is newly entered and stored in the keyless entry code management part 52.

Next, the same temporary entry code as that entered newly in Step S206 is transmitted to the cellular phone of the vehicle owner. This is performed so that the temporary entry code in the vehicle matches that in the cellular phone of the vehicle owner. The content of Step S206 corresponds to Step S182 to Step S186 in FIG. 9. If the transmission is finished, or the transmission is not finished in a predetermined time, the process flow goes to Step S208.

On the other hand, if it is confirmed in Step S202 that the temporary reference entry code is already stored in the keyless entry code management part 52, the process flow goes to Step S210 in which it is checked whether or not the code is already transmitted to the vehicle owner. Then, if it is not transmitted, the process flow goes to Step S206 in which it is transmitted. The case where it is not transmitted corresponds to the case where the temporary reference entry code is newly entered in Step S204, and then the transmission process failed in Step S206.

In Step S208, it is checked whether or not the report indicating that the substitute drive service has been requested is transmitted from the cellular phone of the vehicle owner and is received by the vehicle. Then, if it is received, the process flow goes to Step S212 in which it is checked whether or not 24 hours have passed from receiving the substitute drive service request report. Then, if it has passed, the process flow goes to Step S214 in which it is checked whether or not the temporary entry code update after 24 hours have passed is transmitted.

Further, if the update temporary entry code is not transmitted, the process flow goes to Step S216 in which data is read from the update entry code register, and the temporary reference entry code stored in the keyless entry code management part 52 is updated. Then, the update temporary entry code is transmitted to the cellular phone of the vehicle owner in Step S218. A content of Step S218 also corresponds to Step S182 to Step S186 in FIG. 9. If the transmission is finished, or if the transmission is not finished in a predetermined time, the process flow is finished. Note that if the process flow is finished with the unfinished transmission, the code management process of Step S158 is performed again in the repetition of the fundamental process flow illustrated in FIG. 7, and when the temporary entry code management process of Step S196 is performed, Step S212 to Step S218 is performed so that transmission of the updated temporary entry code to the vehicle owner is tried again.

On the other hand, if 24 hours have not passed after the request report reception in Step S212, the process flow is finished promptly. In addition, the process flow is finished promptly also in the case where the updated temporary entry code is already transmitted in Step S214.

As described above, if the substitute drive service request report is received, the temporary entry code is updated when 24 hours have passed after that. Therefore, the temporary entry code transmitted from the cellular phone of the vehicle owner to the substitute drive service agent becomes invalid. Thus, even if an unexpected situation in which the temporary entry code transmitted externally is leaked has occurred, entry into the vehicle using the temporary entry code becomes impossible after 24 hours have passed. On the other hand, if the substitute drive service is requested, it is secured that the temporary entry code transmitted to the substitute drive service agent is not updated for 24 hours. Therefore, it is impossible to change the temporary entry code arbitrarily in that period so that the substitute drive service agent cannot enter. In contrast, if the entry code is for the vehicle owner in person, it is changed appropriately in the case where the date changes as illustrated in Step S178 and Step S180 of FIG. 9, or in the case where the cellular phone is placed on the cradle of the vehicle as illustrated in Step S188 to Step S194 of FIG. 9.

On the other hand, if the substitute drive service request report is not received in Step S208, the process flow goes to Step S220 for a safety process. This safety process is intended for the case where the substitute drive service is requested, but the report thereof is not received by the vehicle due to a communication environment. Instead of updating the temporary reference code automatically at a predetermined time as illustrated in Step S212 to Step S216, update of the entry code is performed by a predetermined procedure considering safe driving so as to prevent theft of the vehicle due to a leakage or forgery of the entry code.

Figure 11:
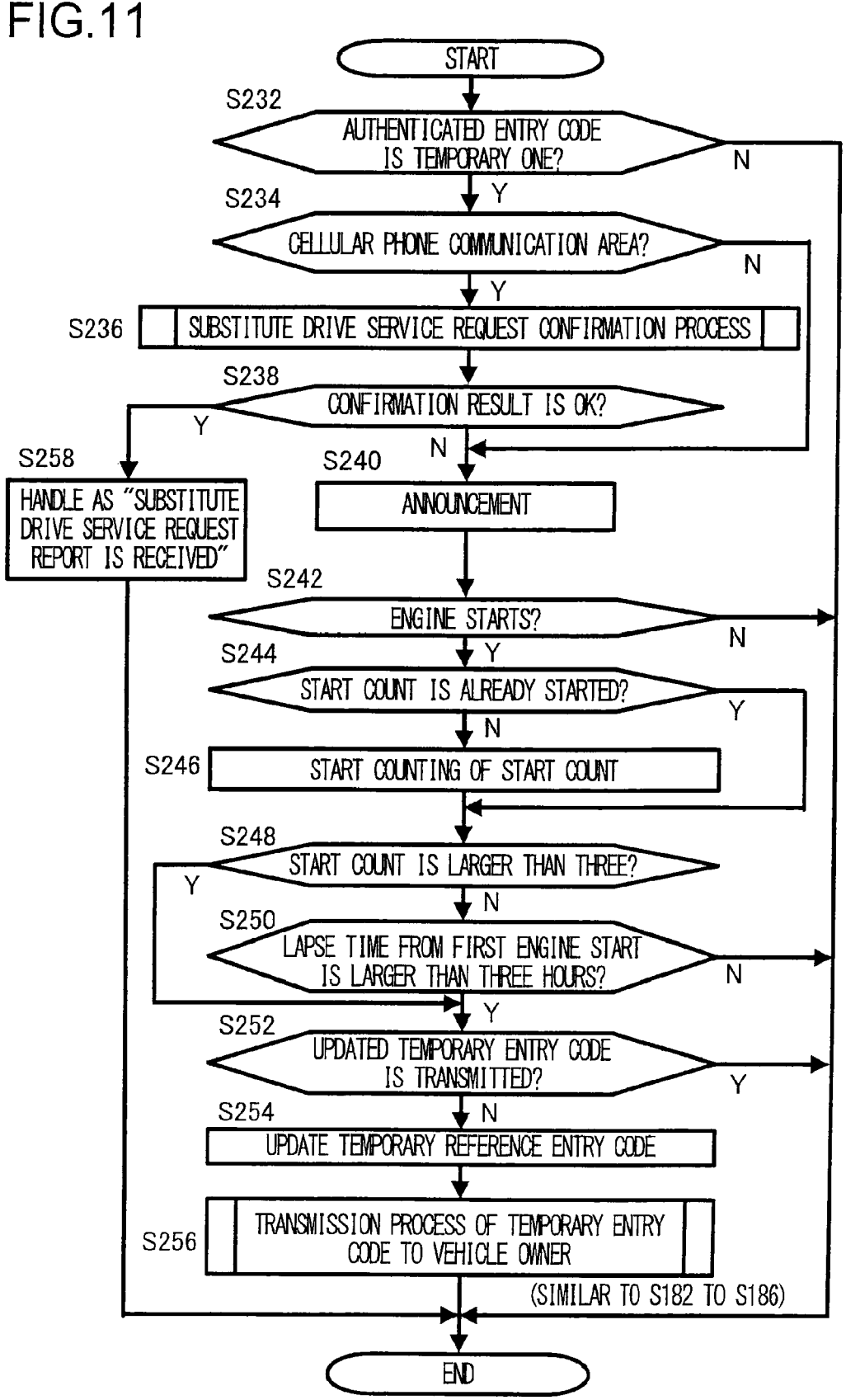
FIG. 11 is a flowchart illustrating a detail of a safety process in Step S220 of FIG. 10.

FIG. 11 is a flowchart illustrating a detail of the above-described safety process in Step S220 of FIG. 10. When the process flow starts, it is checked whether or not there is the case where the keyless entry process was performed and the authenticated data corresponds to the temporary authentication entry code. In other words, it is checked whether or not the keyless entry process has been performed with a valid temporary entry code.

If the keyless entry process was not performed at this time point, or if the keyless entry process was performed with the cellular phone of the vehicle owner, it is not related to Step S232. In this case, it is not necessary to perform the safety process, so the process flow is finished promptly.

On the other hand, if the keyless entry process was performed with a valid temporary entry code, the process flow goes from Step S232 to Step S234 in which it is checked whether or not the cellular phone of the owner is in the area where communication can be performed. Then, if it is in the communication area, a substitute drive service request confirmation process is performed in Step S236. This has the same meaning as the substitute drive service request report process to the vehicle in Step S98. In the Step S98, the cellular phone reports to the vehicle. In contrast, the vehicle reports to the cellular phone in Step S236. In this way, even if the vehicle is parked in a parking lot outside the communication area for example so that the report indicating that the substitute drive service has been requested cannot be received by the vehicle at the stage of Step S98, the substitute drive service agent may move the vehicle so that the vehicle enters the communication area. Then, Step S234 to Step S236 function so that the process is automatically performed for the vehicle to obtain the information indicating that the substitute drive service has been requested.

Then, in the next Step S238, it is checked whether or not the substitute drive service request is confirmed. If it is OK, it is not necessary to perform the safety process. Therefore, the process flow goes to Step S258 in which it is handled in the same manner as the case where the substitute drive service request report has been received, and the process flow is finished.

In contrast, if the substitute drive service request cannot be confirmed in Step S236, the process flow goes from Step S238 to Step S240 in which an announcement is performed. This announcement is performed for warning the driver in advance that if a predetermined condition which will be described later is satisfied, the driver cannot enter the vehicle or start the engine, so as to prevent an unexpected situation due to being unable to enter the vehicle or to start the engine. In addition, if the predetermined condition which will be described later is satisfied to be unable to enter the vehicle or to start the engine, the driver is informed of the reason thereof.

Then, in Step S242, it is checked whether or not the engine is started with the temporary keyless entry code. If the engine is not started yet, the safety process is not started and the process flow is finished promptly.

On the other hand, if it is detected in Step S242 that the engine is started, the safety process is started, and it is checked in Step S244 whether or not the count of the number of starting the engine and lapse time from the first engine start is already started. Then, if it is not started yet, the process flow goes to Step S246 in which count of the number of times of starting the engine and lapse time from the first engine is started, and the process flow goes to Step S248. On the other hand, if it is detected in Step S244 that the count is already started, the process flow goes to Step S248 directly.

In Step S248, it is checked whether or not the number of times of starting the engine has reached a predetermined number of times (e.g., three times). If it has not reached yet, it is checked in the next Step S250 whether or not the lapse time from the first engine start has reached a predetermined time (e.g., three hours). Then, if both of them are false, the process flow is finished.

In contrast, if it is detected in Step S248 that the number of times of starting the engine has reached the predetermined number of times or if it is detected in Step S250 that the lapse time from the first engine start has reached the predetermined time, the process flow goes to Step S252 in which it is checked whether or not the temporary entry code updated after the first engine start has been transmitted to the vehicle owner. If it has not been transmitted yet, the process flow goes to Step S254 in which the temporary reference entry code is updated. Thus, after that, it becomes impossible to enter the vehicle or to start the engine with the original temporary entry code.

As described above, theft of the vehicle or other malpractice due to a leakage or forgery of the entry code can be prevented while preventing a dangerous situation when an authorized substitute drive service agent drives the vehicle without the substitute drive service request report to the vehicle.

In Step S254, if the temporary reference entry code is updated, the process flow goes to Step S256 in which the updated temporary entry code is transmitted to the cellular phone of the vehicle owner. A content of Step S256 also corresponds to Step S182 to Step S186 in FIG. 9. If the transmission is finished, or if the transmission has not finished in a predetermined time, the process flow is finished.

Note that in the process of dealing in the same manner as the case of the substitute drive service request report in Step S258, even if the temporary reference entry code is updated via Step S254, it is returned to the temporary reference entry code when the engine is started in Step S242. Then, the management of the temporary entry code is performed by the process from Step S212 to Step S218 in FIG. 10. Therefore, even if the entry is once disabled by Step S254, the process flow goes from Step S236 to Step S258 via Step S238 in which keyless entry with the original temporary entry code becomes enabled unless 24 hours have passed from the substitute drive service request.

Figure 12:
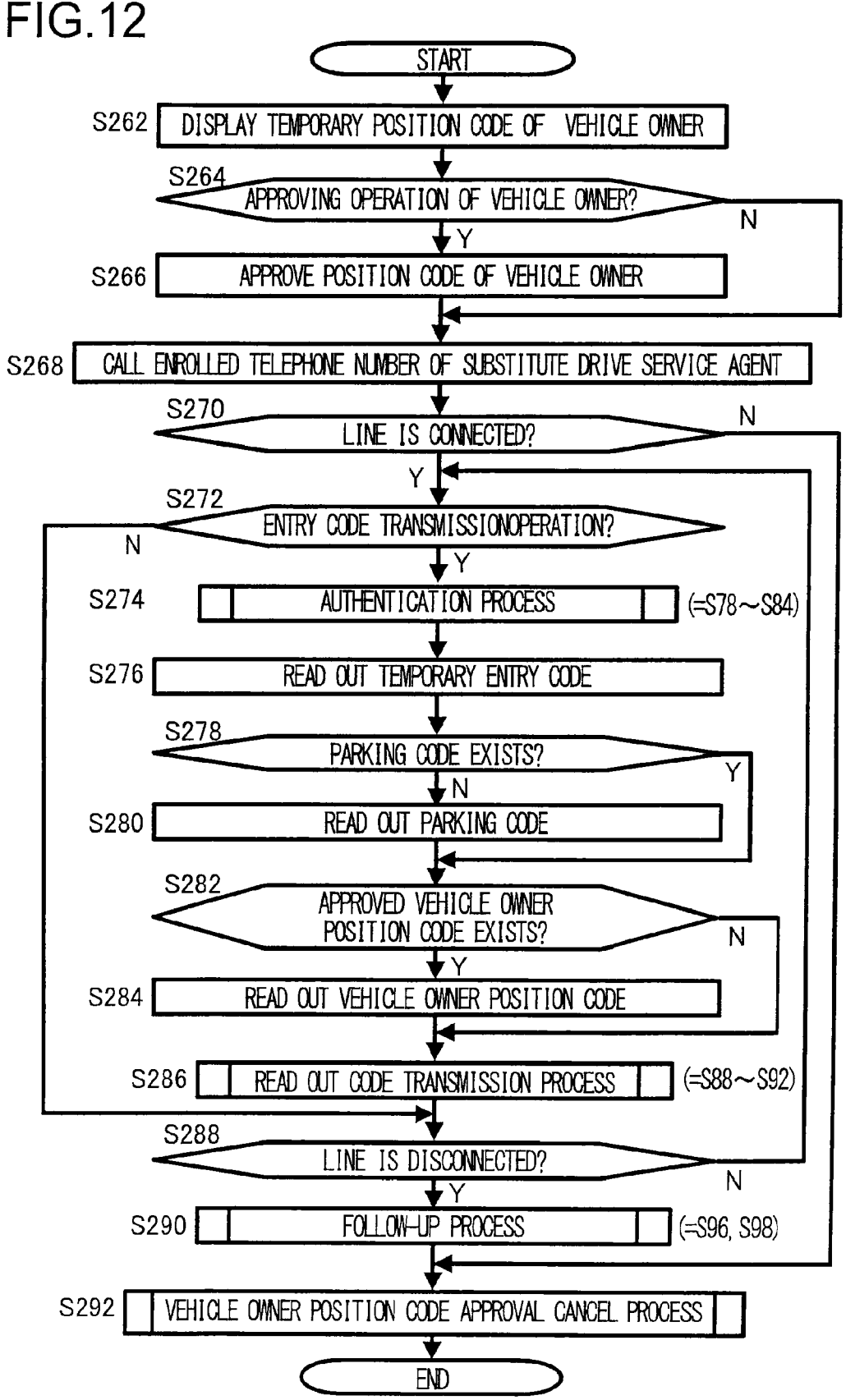
FIG. 12 is a flowchart illustrating a function of the cellular control part when a telephone call operation to the substitute drive service agent is performed in Example 3 of the keyless entry system according to the embodiment of the present invention.

FIG. 12 is related to Example 3 of the keyless entry system according to the embodiment of the present invention. Example 3 is basically similar to Example 1, and a detail of the structure can be understood with reference to FIG. 1. In addition, Example 3 can be carried out also in Example 2 illustrated in FIG. 8. Example 3 is different from Example 1 and Example 2 in that a function of handling information of a parking position of the vehicle and positional information of the vehicle owner in the substitute drive service request is added to the first cellular control part 6 illustrated in FIG. 1 or 8.

FIG. 12 is a flowchart illustrating a function of the first cellular control part 6 when the telephone operating part 8 performs the telephone call operation to the substitute drive service agent who has been enrolled, similarly to FIG. 5. When the process flow starts, the code that is temporarily stored as a present position of the vehicle owner who has the first cellular phone 1 is displayed in Step S262. This vehicle owner temporary position code is stored as the latest present position of the vehicle owner, and a detail thereof will be described later.

Next, in Step S264, it is checked whether or not the operation of approving the displayed vehicle owner position code by the vehicle owner has been performed from a display in a predetermined time. The vehicle owner having the first cellular phone 1 does not always wait the vehicle that is driven by the substitute drive service agent at the position indicated by the stored vehicle owner temporary position code when requesting the substitute drive service. Therefore, the process from Step S262 and Step S264 is provided for checking whether or not the vehicle owner has an intention to wait the substitute drive service agent at the displayed position.

If the approval operation is detected, the process flow goes to Step S266 in which the temporary code displayed in Step S262 is approved as the vehicle owner position code, and the process flow goes to Step S268. On the other hand, if the approval operation is not detected in a predetermined time in Step S264, the process flow goes to Step S268 directly. In this case, the process flow goes to Step S268 without the approved vehicle owner position code.

In Step S268, calling operation to the telephone number of the enrolled substitute drive service agent is performed similarly to Step S72 in FIG. 5, and it is checked in Step S270 whether or not the line is connected in a predetermined time.

If the connection is confirmed, the process flow goes to Step S272 in which it is checked whether or not the operation for transmitting the entry code has been performed by the telephone operating part 8. Then, if it is confirmed that the operation has been performed, the process flow goes to Step S274 for authentication process. This authentication process is similar to Step S78 to Step S84 in FIG. 5 and is a process of performing authentication of the substitute drive service agent to whom the line is connected by transmission of the request signal and detection of the authentication return signal. Note that in the authentication process of Step S274, similarly to FIG. 5, if the authentication signal is not detected in a predetermined time after the transmission of the authentication request signal, the process flow can go directly to Step S288 for inquiring a line disconnection operation that will be described later, which is not illustrated in FIG. 12.

In addition, in the authentication process in Step S274 that is similar to FIG. 5, the transmission of the authentication request signal and the communication of the authentication return signal are performed by superimposing on the sound signal, but the present invention is not limited in this embodiment and may be performed by a normal data communication.

If the authentication of the substitute drive service agent is succeeded in Step S274, the process flow goes to Step S276 that is similar to Step S86 in FIG. 5, in which the temporary entry code is read out from the keyless entry code storage part 30.

In the next Step S278, it is checked whether or not the parking code indicating the parking position of the vehicle of the substitute drive service request is stored in the storage part 12. If it is stored, it is read out in Step S280 and the process flow goes to Step S282. On the other hand, if the parking code is not detected in Step S278, the process flow goes to Step S282 directly.

In Step S282, it is checked whether or not the vehicle owner position code that has been approved in Step S266 is stored in storage part 12. If it is stored, it is read out in Step S284 and the process flow goes to Step S286. On the other hand, if the approved vehicle owner position code is not detected in Step S282, the process flow goes to Step S286 directly.

In Step S286, a transmission process is performed for transmitting the codes that have been read out in Step S276, Step S280 and Step S284 as described above. If these are all transmitted, the substitute drive service agent can drive the vehicle with the temporary entry code and can obtain information of where the vehicle is to be fetched and where it is to be driven.

As a matter of course, if there is not one or both of the read codes in Step S280 and Step S284, each of the codes is not transmitted. In this case, the substitute drive service agent should obtain the information for driving the vehicle appropriately by making contact with the vehicle owner. The information of the parking position and the present position of the vehicle owner can be obtained orally over the phone when requesting the substitute drive service, and can be supplemented appropriately by communication afterward.

The read code transmission process in Step S286 is similar to Step S88 to Step S92 in FIG. 5, and is for securing reading out and transmitting the code by detection of the transmission of the read code and the reception acknowledge signal. Also in the read code transmission process in Step S286, similarly to FIG. 5, if the reception acknowledge signal cannot be detected in a predetermined time after the transmission of the read signal, the process flow can go directly to Step S288 for a process of inquiring the line disconnection, which is not illustrated in FIG. 12.

In addition, also in the transmission process of Step S286, similarly to FIG. 5, the transmission of the read code and the communication of the reception acknowledge signal by superimposing on the sound signal, but the present invention is not limited to this embodiment. It is possible to perform it by a normal data communication.

If the read code transmission process is finished in Step S286, the process flow goes to Step S288 similarly to Step S94 in FIG. 5, in which it is checked whether or not the line disconnection operation has been performed. Then, if the line is disconnected, the process flow goes to Step S290 for a follow-up process. On the other hand, if the line disconnection operation is not detected in Step S288, the process flow goes back to Step S272, and the process of Step S272 to Step S288 is repeated.

The follow-up process in Step S290 is similar to Step S96 and Step S98 in FIG. 5, and is for checking whether or not the read code transmission has succeeded and for reporting to the vehicle 3 if it has succeeded. Further, similarly to the process flow proceeding to the end in FIG. 5, the process flow goes to the next Step S292 regardless of success or not of the read code transmission. Note that the process flow goes to Step S292 also in the case where the line cannot be connected in Step S270.

If the vehicle owner position code is approved in Step S266, Step S292 is a process of cancelling the same. The approval in Step S266 is limited to the occasion when requesting the substitute drive service, and it is rare that the owner of the first cellular phone 1 stays at the same position. In other words, the approval performed in Step S266 is a dead one after it is sent to the substitute drive service agent in the substitute drive service request, and it is also needless in the case where the substitute drive service request cannot be performed. Therefore, in order to avoid confusion after that, Step S292 is provided in which if the approval of the vehicle owner position code is performed in either case, the approval is canceled and the process flow is finished.

Figure 13:
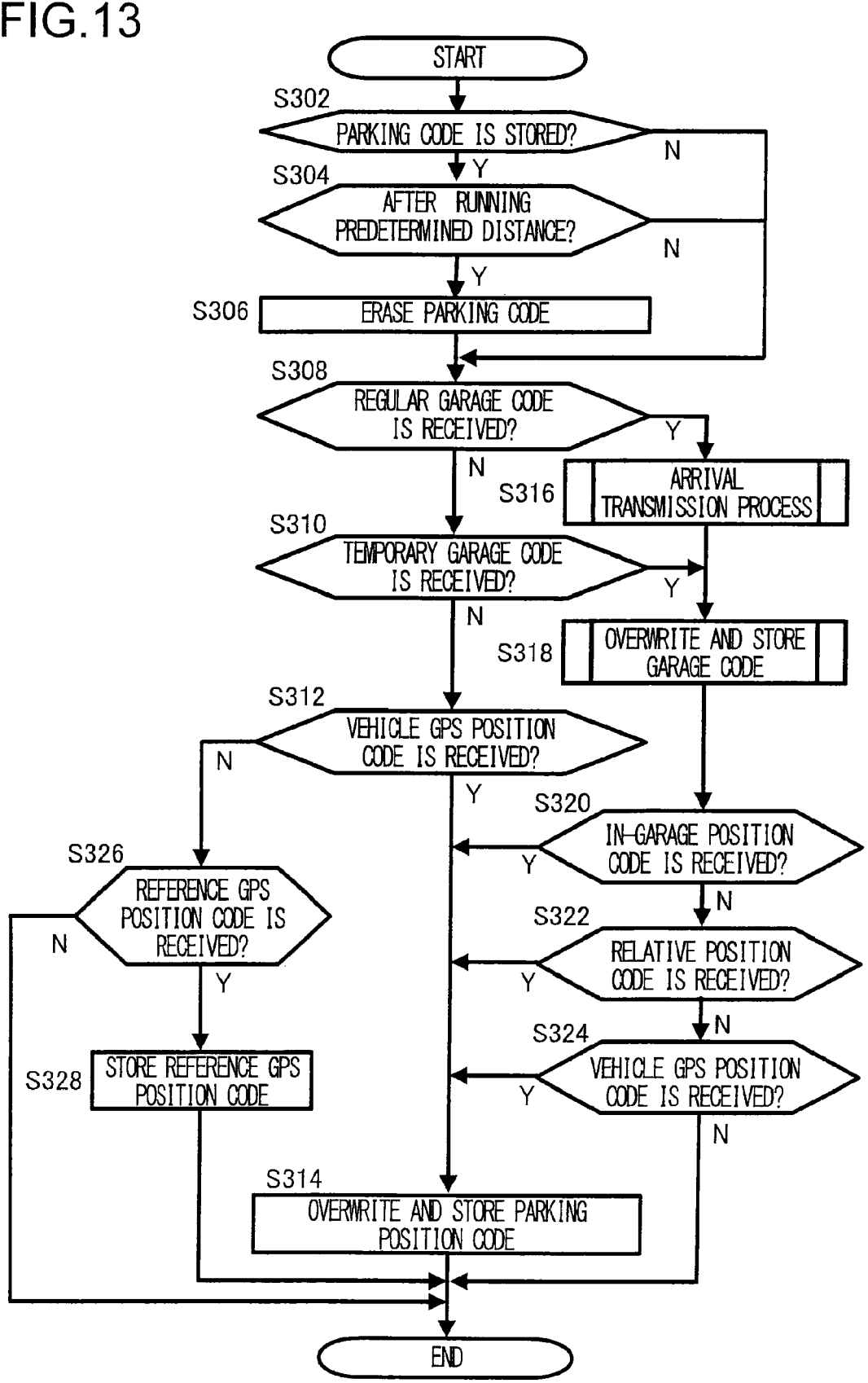
FIG. 13 is a flowchart illustrating a function of the cellular control part for obtaining a parking code which is handled in Step S280 of FIG. 12 according to Example 3.

FIG. 13 is related to Example 3 and is a flowchart illustrating a function of the first cellular control part 6 for obtaining the parking code that is handled in Step S280 of FIG. 12. The process flow illustrated in FIG. 13 starts by stopping the engine of the vehicle. First in Step S302, it is checked whether or not the parking code is stored in the storage part 12 of FIG. 1.

Then, if it is stored, the process flow goes to Step S304 in which communication with the vehicle is performed. Then, it is checked whether or not the engine has been stopped after running a predetermined distance (e.g., 50 meters) after storing the parking code.

If it is detected in Step S304 that the engine has been stopped after running a predetermined distance, the process flow goes to Step S306 in which the parking code stored in the storage part 12 is erased and the process flow goes to Step S308. On the other hand, if it is decided in Step S302 that the parking code is not stored, the process flow goes directly to Step S308. In addition, the process flow goes directly to Step S306 also in the case where it is detected in Step S304 that the engine has been stopped not after running a predetermined distance or longer. In this case, the stored parking code is maintained.

The above-described process is aimed at the case where the parking code that has no meaning as information is stored, which should be erased for avoiding confusion.

In Step S308, it is checked whether or not a code of a garage that is regularly used, such as a garage at home or a garage at working place (or a parking lot which will also be called a garage collectively in the following description), is received by the first cellular short-range communication part 20. This is enabled in the case where the short-range communication part 62 or the like is provided to the garage as the parking lot 4, so that the vehicle 3 that enters the short-range communication area and is parked can be detected, and that the code specifying the garage is transmitted.

If it is not the case, the process flow goes to Step S310 in which it is checked whether or not the code specifying the garage that is temporarily used is received by the first short-range communication part 20. This is enabled in the case where the short-range communication part is provided also to the temporary garage similarly to the regular garage. Note that this garage code is preferably managed integrally by the common system.

If it is not true in Step S310, the process flow goes to Step S312 in which it is checked whether or not the vehicle GPS position code is received by the GPS part 16 of the first cellular phone 1 when the engine is stopped.

Note that the position data obtained by the GPS part 16 of the first cellular phone 1 is the vehicle GPS position code in the above description. This is because that the holder of the first cellular phone 1 is driving the vehicle 3, and therefore it can be regarded that the position of the first cellular phone 1 is the position of the vehicle 3. Instead of this, it is possible to adopt another structure in which the data received by the GPS part 46 of the vehicle 3 is regarded as the vehicle GPS position code, and this is relayed from the vehicle short-range communication part 48 to the first cellular short-range communication part 20.

In either case described above, if the vehicle GPS position code is received by the first cellular phone 1, the process flow goes to Step S314 in which the received code is overwritten as the parking position code on the old code and is stored in the storage part 12 for updating, and the process flow is finished.

On the other hand, if it is detected in Step S308 that the regular garage code is received, the process flow goes to Step S316 in which an arrival transmission process is performed. This transmission is performed automatically to home or the working place by the first telephone communication part 18 (or the first cellular short-range communication part 20, if possible), so that families can be informed of the homecoming or it can be used as attendance management information in a time card system. In this way, because the transmission is performed from the cellular phone 1, it is sufficient that the regular garage has only the short-range communication part for a simple function of automatically transmitting the regular garage code.

When the arrival transmission process is completed, the process flow goes to Step S318 in which the garage code in the storage part 12 is overwritten with the received code and is stored for updating, and the process flow goes to Step S320.

In addition, the process flow goes to Step S318 also in the case where it is detected in Step S310 that the temporary garage code is received, in which the garage code in the storage part 12 is overwritten with the received code and is stored for updating, and the process flow goes to Step S320.

Note that the garage code stored in Step S318 functions as the parking code that is complementary with the parking position code stored in Step S314. In other words, the garage code specifies the enrolled parking lot name or the like, which is managed as a standardized code, so it is suitable for setting as a destination or the like in the navigation system as described later. In contrast, the parking position code is not suitable for standardization but is suitable for specifying a position where the vehicle is actually parked in a large parking lot whose parking lot name can only be specified by the garage code alone.

In Step S320, it is checked whether or not the code specifying the parking position in the garage, adding to the garage code stored in Step S318, is received. This in-garage position code is transmitted from the short-range communication part of the garage under the management by the system of every garage, which can specify the parking position number, for example. Then, if this in-garage position code is received, the process flow goes to Step S314 in which the received code is overwritten and stored in the storage part 12, and the process flow is finished.

On the other hand, if it is not detected in Step S320 that the in-garage position code is received, the process flow goes to Step S322 in which it is checked whether or not the code indicating the relative position of the vehicle in the garage is received. Such the relative position code can be obtained in the garage in which a plurality of short-range communication parts are disposed like the parking lot first short-range communication part 62 and the parking lot second short-range communication part 64 which share the communication area, as the parking lot 4 illustrated in FIG. 1. In other words, the parking lot control part 58 locates the relative position of the first cellular phone 1 in the parking lot 4 based on the radio wave analysis of which short-range communication part in the parking lot 4 can communicate with the first cellular phone 1, or the radio wave analysis of the triangular communication among the plurality of short-range communication parts in the parking lot 4 and the first cellular phone 1, and the location result is transmitted as the relative position code to the first cellular short-range communication part 20. Then, if this relative position code is received, the process flow goes to Step S314 in which the received code is overwritten and stored in the storage part 12, and the process flow is finished.

If it is not detected in Step S322 that the relative position code is received, the process flow goes to Step S324 in which it is checked whether or not the vehicle GPS position code is received. Further, the process flow goes to Step S314 also in the case where the vehicle GPS position code is received, in which the received code is overwritten and stored in the storage part 12, and the process flow is finished. On the other hand, if it is not detected in Step S324 that the vehicle GPS position code is received, the process flow is finished. In this case, the garage code stored in Step S318 is only the parking code, and the parking position code is not stored.

If the vehicle GPS position code is not received in step S312 by the GPS part 16 of the first cellular phone 1 when the engine is stopped, it means that the vehicle is outside the communication area of the GPS when the engine is stopped. In this case, the process flow goes to Step S326 in which it is checked whether or not the latest GPS information just before being outside the communication area among the GPS information stored in the vehicle in the navigation process is received as a reference GPS position code from the short-range communication part of the vehicle. Then, if it is received, the process flow goes to Step S328 in which the reference GPS position code is stored and the process flow is finished. This reference GPS position code does not indicates the parking position of the vehicle in the strict sense, but it is GPS information just before being outside the GPS communication area before reaching the parking position. Because it is information of a position close to the parking position of the vehicle, it can be used as reference information for finding the vehicle.

Figure 14:
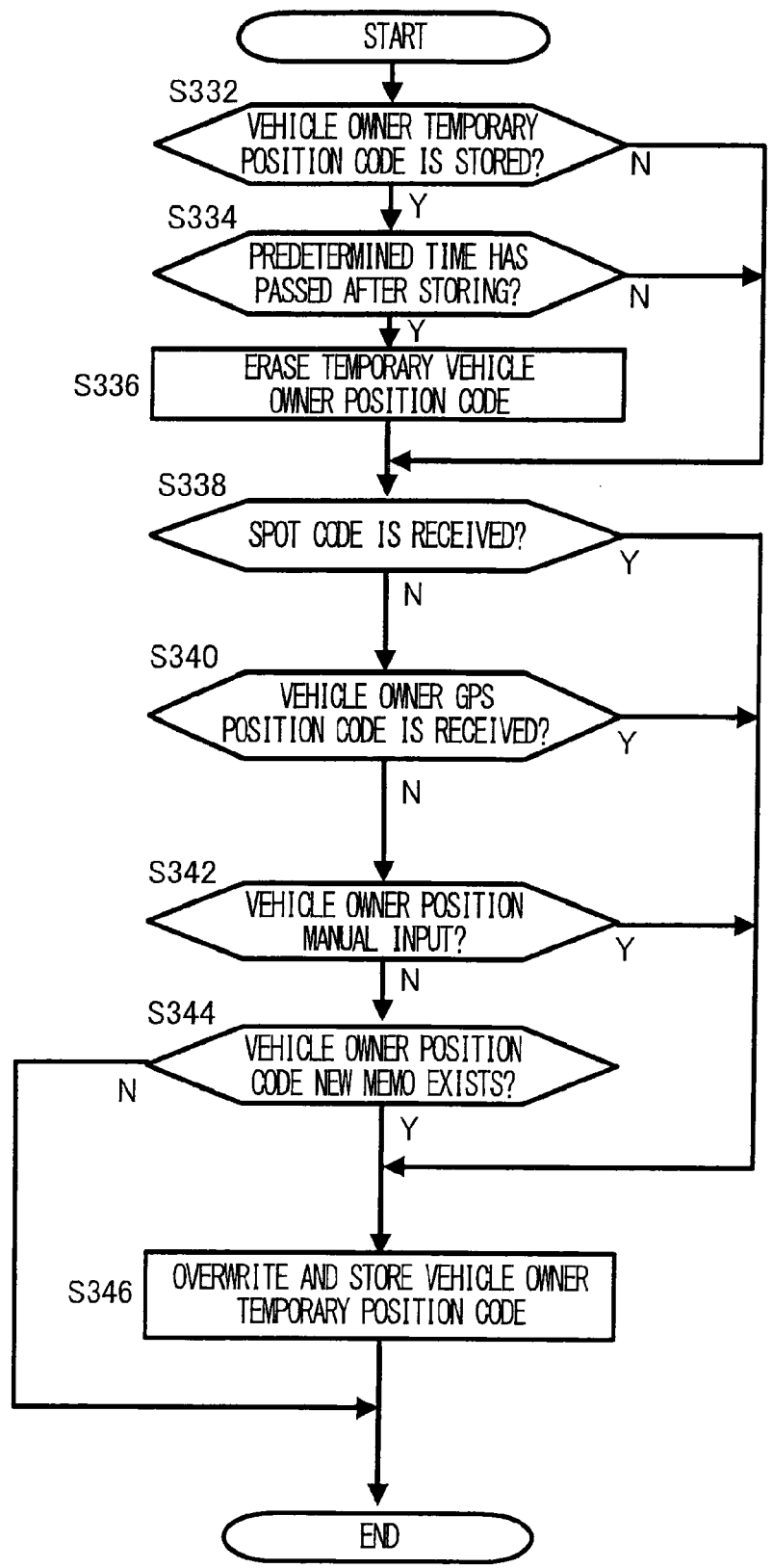
FIG. 14 is a flowchart illustrating a function of the cellular control part for obtaining a vehicle owner temporary position code which is displayed in Step S262 of FIG. 12 according to Example 3.

FIG. 14 relates to Example 3 and is a flowchart illustrating a function of the first cellular control part 6 for obtaining the vehicle owner temporary position code that is displayed in Step S262 of FIG. 12. The process flow illustrated in FIG. 14 is started automatically by an interrupt every predetermined set period (e.g., 30 minutes), or when the first cellular short-range communication part has received a spot code from a predetermined spot (e.g., a facility or a restaurant or the like), or when the GPS part 16 of the first cellular phone 1 has received new GPS information. In addition, when the manual operation of entering the position code is performed with the telephone operating part 8 too, the interrupt occurs so that the process flow in FIG. 14 starts.

When the process flow starts, it is checked in Step S332 whether or not the vehicle owner temporary position code is stored in the storage part 12. Then, if it is stored, the process flow goes to Step S334 in which it is checked whether or not a predetermined time (e.g., 12 hours) has passed after the code is stored.

If it is detected in Step S334 that a predetermined time has passed, the process flow goes to Step S336 in which the vehicle owner temporary position code stored in the storage part 12 is erased and the process flow goes to Step S338. On the other hand, if it is decided in Step S332 that the vehicle owner temporary position code is not stored, the process flow goes directly to Step S338. In addition, also if it is confirmed in Step S334 that a predetermined time has not passed, the process flow goes directly to Step S336. In this case, the stored vehicle owner temporary position code is maintained.

The above-described process is aimed at the case where the vehicle owner has moved as time passes so that a meaningless vehicle owner temporary position code is stored, which should be erased for avoiding a confusion.

In Step S338, it is checked whether or not the process flow in FIG. 14 has started as a result of receiving the spot code. Then, if it is false, the process flow goes to Step S340 in which it is checked whether or not the process flow in FIG. 14 has started as a result of receiving the vehicle owner GPS position code.

If it is also false, the process flow goes to Step S342 in which it is checked whether or not the process flow in FIG. 14 has started as a result of the manual input of the vehicle owner position.

Further, if it is also false, the process flow goes to Step S344 in which it is checked whether or not the process flow in FIG. 14 has started after a predetermined set period has passed, the vehicle owner position code obtained from an information source other than Step S338, Step S340 and Step S342 is received and stored, and it is newer than information obtained in one of Step S338, Step S340 and Step S342.

Then, if there is information corresponding to the condition of Step S344, the process flow goes to Step S346 in which the information is overwritten and stored as a temporary positional information code of the vehicle owner in the storage part 12, and the process flow is finished. On the other hand, if there is no newly received memory corresponding to Step S344, process flow is finished promptly.

In addition, also if it is detected that information of the vehicle owner position is obtained in one of Step S338, Step S340 and Step S342, the process flow goes to Step S346 in which the information is overwritten and stored as the temporary positional information code of the vehicle owner in the storage part 12, and the process flow is finished.

Figure 15:
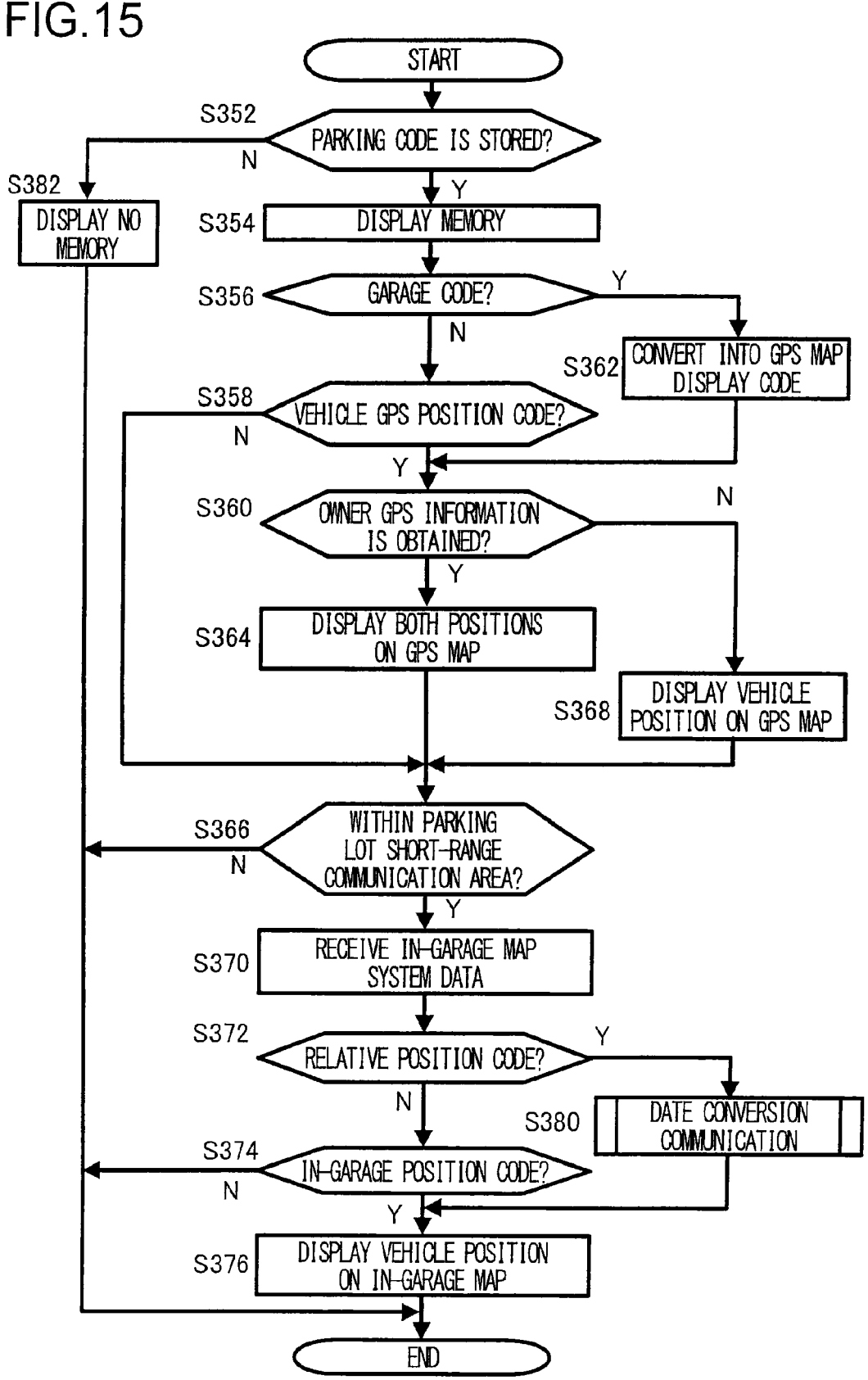
FIG. 15 is a flowchart illustrating a function of the cellular control part for finding the vehicle by utilizing the parking code stored in FIG. 13 according to Example 3.

FIG. 15 is related to Example 3 and is a flowchart illustrating a function of the first cellular control part 6 for finding the vehicle by using the parking code stored in FIG. 13. Note that the process flow in FIG. 15 functions both in the case where the first cellular phone 1 is one held by the vehicle owner and in the case where it is one held by the substitute drive service agent. Note that in the latter case, the parking code is not one that is stored by itself but is one that is transmitted from the cellular phone of the vehicle owner to the cellular phone of the substitute drive service agent by the function of Step S280 and Step S286 in FIG. 12.

The following description exemplifies the case where the substitute drive service agent is a holder of the first cellular phone 1, for describing the function of the first cellular control part 6. This is because that the substitute drive service agent did not park the vehicle and doesn't know the parking lot of the vehicle. Therefore, the substitute drive service agent can enjoy the function of FIG. 15 more, and this function is an important factor for the substitute drive service. However, also in the case where the vehicle owner parked the vehicle, he or she may forget the place where he or she parked in the large area of the parking lot. In this case, the function of FIG. 15 is useful also for the vehicle owner.

The process flow of FIG. 15 is started by interrupt when the telephone operating part 8 is operated manually for finding the vehicle. It is also started automatically by interrupt when approaching the parking lot and entering the short-range communication area. When the process flow starts, it is checked in Step S352 whether or not the parking code is stored. In the case of the substitute drive service agent, it is checked whether or not the parking code is received together with the temporary entry code and is stored in the storage part 12.

If it is stored, the process flow goes to Step S354 in which a display indicating that it is stored is performed, and the process flow goes to Step S356. In Step S356, it is checked whether or not the garage code is contained in the parking code. Then, if it is not detected that the garage code is contained, the process flow goes to Step S358 in which it is checked whether or not the vehicle GPS position code is contained in the parking code.

If it is detected in Step S358 that the vehicle GPS position code is contained, the process flow goes to Step S360. On the other hand, if it is detected in Step S356 that the garage code is contained in the parking code, the process flow goes to Step S362 in which the garage code is converted into the GPS position code that can be displayed on a GPS map, and the process flow goes to Step S360.

In Step S360, it is checked whether or not the GPS information of the owner of the first cellular phone 1 who is looking for the vehicle (the substitute drive service agent in this description) is obtained by the GPS part 16 of the first cellular phone 1. Then, if it is obtained, the process flow goes to Step S364, the vehicle position as a target or the garage position and the substitute drive service agent that is a start point are both displayed on the GPS map. Thus, the positional relationship between the start point and the parking lot, a path and the like can be decided. In this case, not only the start point and the parking lot position that is a target position are displayed, but also a path between them may be calculated and displayed.

When the map display is performed in Step S364, the process flow goes to Step S366 maintaining the display. On the other hand, the GPS position code of the substitute drive service agent cannot be obtained in Step S360 due to a reason that he or she is not in the communication area or other reason, the process flow goes to Step S368 in which only the vehicle position is displayed on the GPS map, so that the parking lot position can be confirmed on the map. In this case too, the process flow goes to Step S366 while maintaining the map display.

In Step S366, it is checked whether or not the first cellular phone 1 has entered the communication area of the short-range communication part of the garage so that the information can be received by the first cellular short-range communication part 20. Then, if it has entered the communication area, the process flow goes to Step S370 in which the data of the in-garage map system is received from the garage. Then, the process flow goes to Step S372 in which it is checked whether or not the relative position code inside the garage is contained in the parking code.

If the relative position code is not detected in Step S372, the process flow goes to Step S374 in which it is checked whether or not the in-garage position code is contained in the parking code. Then, if it is not contained, the process flow goes to Step S376, the vehicle position is displayed on the in-garage map based on the system data and the in-garage position code received in Step S370, and the process flow is finished after instructing to continue the display. Note that this display can be finished by operation of the telephone operating part 8 after it becomes useless.

On the other hand, if the relative position code is detected in Step S372, the process flow goes to Step S380 in which the relative position code is converted into the in-garage position code that can be handled in the display on the map based on the system data received in Step S370. Then, the process flow goes to Step S376, in which the vehicle position is displayed.

Note that if the memory of the parking code is not detected in Step S352, the process flow goes to Step S382 in which a display without the memory is performed and the process flow is finished.

Figure 16:
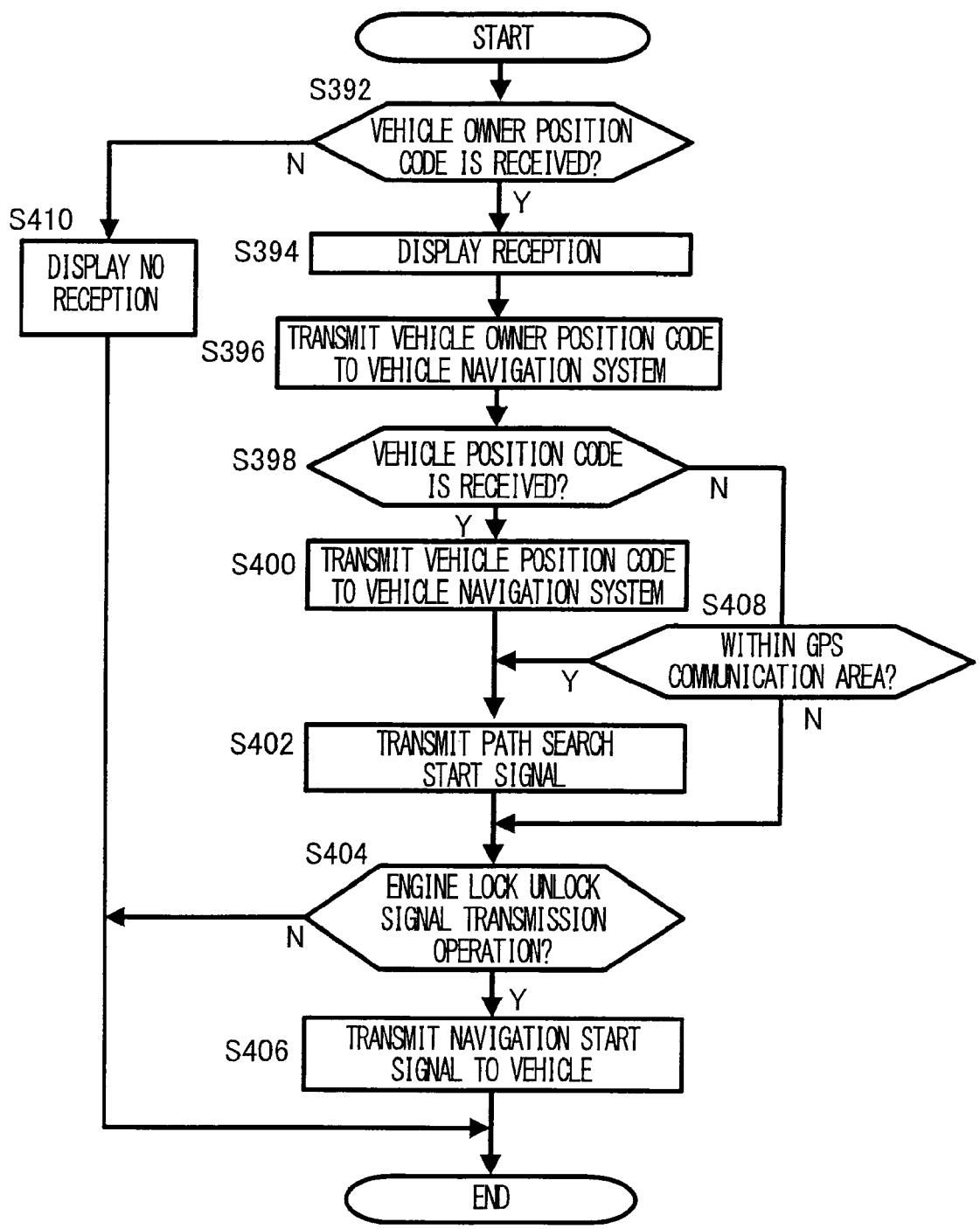
FIG. 16 is a flowchart illustrating a function of a first cellular control part 6 about utilizing a vehicle owner position code which is handled in Step S284 of FIG. 12 according to Example 3.

FIG. 16 is related to Example 3 and is a flowchart illustrating a function of the first cellular control part 6 concerning use of the vehicle owner position code. This vehicle owner position code is stored in FIG. 14 and is approved in Step S266 of FIG. 12, and afterward is transmitted to the substitute drive service agent in Step S286. Therefore, the function in the process flow of FIG. 16 is used as a rule in the case where the first cellular phone 1 is held by the substitute drive service agent.

The process flow in FIG. 16 is started by interrupt when the substitute drive service agent operates the telephone operating part 8 manually for confirming the position of the vehicle owner. It is also started automatically by interrupt when the substitute drive service agent approaches the vehicle 3 and enters the communication area of the vehicle short-range communication part 48.

When the process flow in FIG. 16 starts, it is checked in Step S392 whether or not the vehicle owner position code is received. Then, if it is received, the process flow goes to Step S394 in which the display indicating that it is received is performed and the process flow goes to Step S396.

In Step S396, the received vehicle owner position code is transmitted as a destination to the vehicle navigation system. This transmission is performed by the first telephone communication part 18 or, if possible, by the first cellular short-range communication part 20. Next, in Step S398, it is checked whether or not the vehicle position code indicating the parking position is received. If it is received, the vehicle position code is transmitted as a start point to the navigation system of the vehicle in Step S400.

Next, in Step S402, a path search start signal is transmitted to the vehicle navigation system. In this way, according to the present invention, the navigation system can perform the path search based on start point information and destination information that are not obtained by the vehicle itself with the GPS.

When the path search instruction is finished, the process flow goes to Step S404 in which it is checked whether or not an operation for transmitting a signal for unlocking the engine lock based on the temporary entry code is performed. Then, if it is detected that the engine unlock signal transmission operation is performed, the process flow goes to Step S406 in which the navigation system start signal is transmitted to the vehicle, and the process flow is finished.

On the other hand, if it is not detected in Step S404 that the engine unlock signal transmission operation is performed, the process flow is finished promptly. In this case, the transmission of the engine unlock signal is performed based on another operation.

In addition, if the vehicle position code is not received in Step S398, the process flow goes to Step S408 in which it is checked whether or not the vehicle is parked in the GPS area. Then, if it is parked in the GPS area, the vehicle position code as the start point is obtained directly. Therefore, the process flow goes to Step S402 in which the path search start signal is transmitted to the vehicle navigation system.

On the other hand, it is not detected in Step S408 that the vehicle is parked in the GPS area, the process flow goes to Step S404 in which it is checked whether or not the engine unlock signal transmission operation is performed. In this case, since the navigation system has no start point information, it cannot start the path search promptly. However, the destination information is entered in the navigation system in Step S396. Therefore, when the vehicle is driven out from the garage, it enters in the GPS communication area so that the vehicle position code can be obtained gradually and the path search becomes enabled.

Note that if the vehicle owner position code is not received in Step S392, the process flow goes to Step S410 in which the display without the reception is performed, and the process flow is finished promptly. In this case, another means should be used for contact with the vehicle owner to obtain the path information for the substitute drive service agent to go to pickup L.

In FIG. 1, the vehicle control part 38, the vehicle operating part 40, the storage part 44, the GPS part 46, and the display part (not shown) work together as the car navigation apparatus. When such the car navigation apparatus receives information transmitted in Step S396 and Step S400 of FIG. 16, the received information are set as the vehicle destination information and the vehicle current position information. Then, the car navigation apparatus is instructed to start the path search in Step S402 and calculates the path of the vehicle to run from the vehicle current position information and the vehicle destination information that were received and set.

According to the above-described structure, even if the vehicle is outside the communication area of the GPS, the path to run from the current position to the destination can be found. For instance, even if the vehicle is parked outside the GPS area when the substitute drive service agent reached the vehicle, it is possible to understand the path to run before moving the vehicle.

The various features disclosed above will be summarized as follows.

The first feature is related to various problems to be studied for incorporating the keyless entry function reasonably in a cellular phone.

In other words, the disclosed feature is related to providing a practical cellular phone equipped with the keyless entry function.

As the above-mentioned first feature, this specification discloses a cellular phone that includes a telephone functional part supplied with electricity from the main power source, a telephone communication part supplied with electricity from the main power source, a short-range communication part supplied with electricity from the main power source, a storage part which is supplied with electricity from the main power source and stores data necessary for the telephone functional part, an auxiliary power source for supplying electricity to the storage part, and a keyless entry part supplied with electricity from the auxiliary power source.

The main power source of the cellular phone is required to be charged frequently. However, with the above-described structure, it is possible to avoid an inconvenience that the main power source is exhausted so that the keyless entry cannot be performed. In addition, since power consumption of the keyless entry part is small, the auxiliary power source for backup of the storage part of the cellular phone can be shared by the keyless entry part without loss of the backup function.

According to the disclosed concrete feature, the keyless entry part includes the keyless entry code storage part for storing the keyless entry code and the keyless entry communication part for performing the keyless entry special-purpose communication. This keyless entry part can be supplied with electricity also from the main power source and is structured so that the communication can be performed by the short-range communication part instead of the keyless entry communication part.

More specifically, in addition to the above-described structure, if the auxiliary power source is exhausted, the short-range communication part is used instead of the keyless entry communication part for performing the communication of the keyless entry part.

Thus, when power of the auxiliary power source is further consumed by the keyless entry part, the keyless entry can be performed even if the backup process cannot be performed. It is because there is small probability that both the auxiliary power source and the main power source are exhausted.

According to another concrete features disclosed above, when the main power source is turned on, or when the main power source is charged, or the keyless entry operation is performed, if the auxiliary power source is exhausted, it is alarmed so that replacement of the auxiliary power source is urged by the control part. Thus, it is possible to avoid the situation where the auxiliary power source is exhausted when the keyless entry operation is necessary.

According to another concrete features disclosed above, the control part is provided, which turns on the main power source in accordance with the keyless entry operation if the main power source is turned off when the keyless entry operation is performed. This is useful particularly in the case where the auxiliary power source is exhausted when the keyless entry operation is performed, so that it is necessary to perform the keyless entry operation with the main power source.

In addition, it is reasonable to have the structure in which if the main power source is turned on in accordance with the keyless entry operation as described above, the main power source is turned off when the keyless entry operation is finished.

As another concrete features disclosed above, the structure in which if the auxiliary power source is exhausted when the main power source is turned on, it is alarmed, or the structure in which if the auxiliary power source is exhausted when the main power source is charged, it is alarmed, is useful also in the case where the keyless entry part does not use power from the auxiliary power source.

Next, a second feature is related to a problem to be studied variously for practical use about management of the entry code.

In other words, the disclosed feature is related to providing a keyless entry apparatus with a countermeasure against leakage or forgery of the keyless entry code in view of transmission of the keyless entry code.

As a second feature described above, this specification discloses a keyless entry apparatus including a reception part for receiving a keyless entry code from an external operation unit, an entry code management part for authenticating the entry by comparing a received keyless entry code with a reference code, a control part for updating the reference code based on a predetermined procedure, and a wireless communication part for transmitting the update keyless entry code corresponding to the updated reference code to the operation unit and for receiving the keyless entry code update finish report from the operation unit.

Thus, even if the keyless entry code is leaked or forged, it is possible to invalidate the keyless entry code by prompt update of the keyless entry code, so that there is no harm in the authentication between the authorized operation unit and the keyless entry apparatus.

Further, according to the disclosed concrete feature, the wireless communication part has the structure in which the transmission of the update keyless entry code to the operation unit is repeated until the reception of the keyless entry code update finish report from the operation unit is enabled, so that there is no harm in the authentication between them. Such the wireless communication part is concretely a short-range wireless communication part, and the entry code update is performed promptly when the operation unit approaches the keyless entry apparatus. In addition, when the operation unit is constituted as a cellular phone, the update keyless entry code can be transmitted by the telephone line if the communication by the short-range wireless communication part cannot be performed.

In addition, according to another concrete features disclosed above, the control part updates the reference code regularly. In addition, the reference code may be updated in accordance with lapse time from a predetermined procedure, or the reference code may be updated in accordance with the number of times of a predetermined operation.

In addition, according to still another concrete features disclosed above, there are provided notice means for noticing update of the reference code in advance or notice means related to the fact that the reference code has been updated. Thus, it is possible to notify in advance the situation where the entry becomes disabled after that only by updating the reference code, or to notify the reason why the entry has become disabled. This is useful for preventing an accident or the like due to abrupt change of the reference code in the case where the entry code is obtained with fixed-term.

In addition, according to another disclosed feature, there is provided a keyless entry apparatus including a reception part for receiving a keyless entry code from an external operation unit, an entry code management part for authenticating the entry by comparing a received keyless entry code with a reference code, a communication part for performing interactive communication of the operation unit, a control part for updating the reference code and the keyless entry code corresponding to the same of the operation unit via the communication part based on a predetermined procedure.

Thus, even if the keyless entry code is leaked or forged, it is possible to invalidate the keyless entry code by prompt update of the keyless entry code, so that there is no harm in the authentication between the authorized operation unit and the keyless entry apparatus.

In addition, the above-described structure is suitable for the case where the operation unit is constituted as a cellular phone, and the communication part is constituted as the wireless communication part, for example. This wireless communication part can be one which uses a cellular phone line.

In addition, as another example, the communication part may be constituted so that interactive communication with the cellular phone can be performed by contact with the cellular phone. Then, in this case, it is preferable to provide a power source for charging the cellular phone by contact with the cellular phone. Thus, when the cellular phone is placed on the keyless entry apparatus for charging, the interactive communication between the cellular phone and the keyless entry apparatus become enabled so that the reference code and the keyless entry code of the cellular phone are correspondingly updated.

In addition, according to another disclosed feature, there is provided a keyless entry apparatus including a reception part for receiving a keyless entry code from an external operation unit, an entry code management part for authenticating the entry by comparing a received keyless entry code with a reference code, and a control part which provides a first reference code and a second reference code for the authentication by the entry code management part and updates the first reference code and the second reference code by different procedures.

In addition, according to the disclosed concrete feature, the control part updates the first reference code for continuous keyless entry by the external operation unit and updates the second reference code for temporary keyless entry by the external operation unit.

The above-described feature is suitable, for example, for the case where the first reference code corresponds to an entry code of his or her own use, and the second reference code corresponds to an entry code which is transmitted for another person's use. It is possible to adopt the structure in which the first reference code is updated arbitrarily by interactive communication between his or her own operation unit and the keyless entry apparatus corresponding to the entry code, while the second reference code is not updated by a predetermined condition but is updated by a different procedure.

In addition, according to another disclosed feature, there is provided a keyless entry apparatus including a reception part for receiving a keyless entry code from a first operation unit or a second operation unit, an entry code management part for authenticating the entry by comparing a received keyless entry code with a reference code, and a control part for updating the reference code and the corresponding keyless entry code of the first operation unit alone based on a predetermined procedure.

This feature is suitable, for example, for the case where the first operation unit is his or hers, while the second operation unit is another person's and is transmitted from the operation unit of the reference code to the other person's operation unit. In this case, the entry code of his or her operation unit is updated corresponding to the reference code, while the entry code transmitted to the other person is not updated. Therefore, he or she can enter continuously, while the other person can enter only temporarily for the period until the reference code is changed.

In addition, according to another disclosed feature, there is provided a keyless entry apparatus including a reception part for receiving a keyless entry code from a first operation unit or a second operation unit, an entry code management part for authenticating the entry by comparing a received keyless entry code with a reference code, and a control part for updating a reference code by difference procedures in accordance with whether or not the keyless entry code is transferred from the first operation unit to the second operation unit.

For instance, the control part maintains the reference code corresponding to the keyless entry code transferred to the second operation unit without updating the same until being a predetermined condition if the keyless entry code is transferred from the first operation unit to the second operation unit.

The above-described feature is also suitable for the case where the first operation unit is his or hers, while the second operation unit is another person's and is transmitted from the operation unit of the reference code to the other person's operation unit. Then, if the entry code is transferred to another person's operation unit, the reference code is not updated so as to secure that the entry is possible as long as considering temporary entry by the operation unit of the other person. On the other hand, if such the transfer is not performed, the entry code and the reference code are changed correspondingly in association with his or her operation unit.

As described above, the disclosed various features are preferably constituted as a keyless entry apparatus for a vehicle, it is not necessary to limit to these. For instance, it can also be used as a keyless entry apparatus for a house.

Next, a third feature is related to a problem to be studied variously for practical use about transmission of the entry code.

In other words, the disclosed feature is related to providing a keyless entry management apparatus for transmitting the keyless entry code.

As the above-mentioned third feature, this specification discloses a keyless entry management apparatus including a holding part for holding a keyless entry code, a transmission part for transmitting the keyless entry code held by the holding part to an external operation unit, and a reporting part for reporting information related to the keyless entry code transmission to the operation unit to an external object of the keyless entry operation.

Thus, the external operation unit is associated with the external object of the keyless entry operation, so that the keyless entry can be performed with the operation unit that has received the keyless entry code.

Note that the above-disclosed feature can be preferably applied to the concrete case where the external operation unit is a cellular phone, and the external object of the keyless entry operation is a vehicle. Thus, it is possible to manage the case of permitting keyless entry in the case where a holder of the operation unit is not a holder of the vehicle. For instance, it is possible to request the substitute drive service when the holder of the vehicle becomes drunk.

In addition, according to the disclosed concrete feature, there is provided a reception part for receiving the keyless entry code transmitted from the object of the keyless entry operation and for storing the same in the holding part. This concrete feature has a large advantage in the case where the entry code is updated in the object of the keyless entry operation for a security reason, and the latest entry code corresponding to the update is transmitted to the external operation unit.

The above-mentioned keyless entry management apparatus may concretely be constituted as a cellular phone. In this case, a communication function of the cellular phone can be used for transmitting the keyless entry code to the external operation unit.

In addition, in the above-mentioned case, more specifically, the entry code may be superimposed on a sound signal in the cellular phone so as to transmit the same. Thus, if the opponent also uses a cellular phone, the keyless entry code can be transmitted to the same opponent while they are talking. In addition, it is possible to prevent wrong transmission of the keyless entry code.

Further, according to another concrete features disclosed above, the keyless entry management apparatus itself can be constituted as an operation unit to the object of the keyless entry operation. In this case, if a vehicle is the object of the operation for example, the owner of the vehicle can perform the keyless entry and can transmit the keyless entry code to another person so that the other person can perform the keyless entry.

In addition, according to another disclosed feature, there is provided a keyless entry management apparatus including a holding part for holding a keyless entry code, a transmission part for transmitting the keyless entry code held by the holding part to an external operation unit, and a control part for designating the holder of the external operation unit to which the keyless entry code should be transmitted by the transmission part.

According to the more concrete feature, the control part is constituted so as to designate a holder of the external operation unit based on an operation of the operating part. In addition, it is possible to constitute so that the control part designates automatically a holder of the external operation unit.

According to the above-described features, the keyless entry code can appropriately be transmitted externally in accordance with various levels of operators or in accordance with various cases.

In addition, according to another concrete features disclosed above, there is provided an enrolling part for enrolling a holder of the external operation unit. Thus, a holder of the external operation unit can easily be designated.

In addition, according to another concrete features disclosed above, there is provided a decision part for deciding whether or not the holder of the external operation unit designated by the control part is covered by an insurance of the vehicle in the case where the object of the keyless entry operation is the vehicle. Thus, it is possible to handle a vehicle insurance problem in accordance with the holder of the designated operation unit.

More concretely, there is provided a vehicle insurance management part which obtains automatically a vehicle insurance to cover the designated holder of the external operation unit when the decision part decided that the designated holder of the external operation unit is not covered by the vehicle insurance. Thus, even the user who does not know how to handle vehicle insurance can transmit the keyless entry code to the holder of the external operation unit without a problem. More specifically, the vehicle insurance to be obtained automatically is preferably a temporary one with inexpensive insurance fee.

On the other hand, it is possible to provide an operating part for selecting yes or no to obtain the vehicle insurance covering the designated holder of the external operation unit when the decision part decides that the designated holder of the external operation unit is not covered by the vehicle insurance, so that the operator can select yes or no to obtain the vehicle insurance. Note that the insurance in this case is not a temporary one but a normal one, and the transmission of the keyless entry code to the holder of the external operation unit is an opportunity of reconsidering the contract condition of the insurance.

In addition, according to another concrete features disclosed above, the control part is constituted so as to perform automatically the designation of the holder of the external operation unit, the handling of the vehicle insurance related to the designated holder of the external operation unit, and the transmission of the keyless entry code by the transmission part. Thus, even if the vehicle holder becomes drunk, he or she can request the substitute drive service without being bothered by the procedure.

As described above, the above-disclosed various features can preferably be used in the case where an owner of a vehicle requests the substitute drive service or the case where an owner of a vehicle lends the car to another person. However, without limiting to the cases, they can be used for management of rental cars, for example. In addition, the object of the keyless entry operation is not limited to a vehicle but can be a door to a house.

Next, a fourth feature is related to a problem to be studied variously for practical use about communication of the vehicle drive information by a communication apparatus such as the cellular phone or the like.

In other words, the disclosed feature is related to providing a communication apparatus that can communicate practical vehicle drive information.

As the above-mentioned fourth feature, this specification provides a communication apparatus including an input part for entering parking positional information of a vehicle, a parking positional information holding part for holding the parking positional information entered by the input part, a transmission part for transmitting the parking positional information of the holding part to the external reception apparatus. Thus, it is possible to inform an external person of the parking position so as to request to drive the vehicle or to lend the vehicle.

According to the disclosed concrete feature, the parking positional information is transmitted together with the keyless entry code by the transmission part. Thus, the person who can enter the vehicle can be informed of the parking position.

The above-mentioned parking positional information is a code specifying a parking facility, for example. In addition, in the environment in which the parking positional information is transmitted from the parking facility, the input part receives it so that the parking positional information can be entered. Then, the parking positional information can be obtained automatically. In addition, if the parking position information contains, for example, information which specifies a parking position in the parking facility transmitted from the parking facility, it is possible to specify not only the parking lot but also the position at which the vehicle is actually parked in a wide parking lot or the like. The parking position information may be GPS information indicating the parking position of the vehicle.

In addition, according to another disclosed feature, there is provided a communication apparatus including a reception part for receiving parking positional information of a vehicle transmitted from an external transmission apparatus, a parking positional information holding part for holding the parking positional information received by the reception part, and a display part for displaying the parking positional information held by the holding part. This is a structure on the reception side of the parking position. Receiving the parking position information in this way, it is possible to reach the vehicle parked at unknown place, to respond the request of driving the vehicle, or to borrow the vehicle. In addition, in the same manner as described above, the keyless entry code is received at the same time, so as to drive the vehicle after reaching the vehicle.

In addition, according to another disclosed feature, there is provided a communication apparatus including an input part for entering destination information of a vehicle, a destination information holding part for holding the entered destination information, and a transmission part for transmitting the destination information held by the holding part to the external reception apparatus. Thus, it is possible to inform an external person of the destination information of the vehicle so as to request to drive the vehicle. Note that it is possible to adopt a concrete structure in which the parking position information and the keyless entry code are transmitted together with the destination information of the vehicle. Thus, when being drunk, he or she can request a substitute drive service agent to drive the vehicle from the parking lot and pick up him or her to drove home.

In addition, according to another disclosed feature, there is provided a communication apparatus including a reception part for receiving destination information of a vehicle transmitted from an external transmission apparatus, a destination information holding part for holding the received destination information, and a display part for displaying destination information held by the destination information holding part. This is a structure on the reception side of the destination information. With this structure, it is possible to run the substitute drive service, for example.

In addition, according to another disclosed feature, there is provided a communication apparatus including a reception part for receiving vehicle current position information and vehicle destination information from an external transmission apparatus, and a car navigation apparatus for calculating a path of a vehicle to run from the received vehicle current position information and the vehicle destination information. According to this structure, even if the vehicle is outside the GPS communication area, it is possible to obtain the path to run from the current position to the destination. For instance, when the substitute drive service agent reaches the vehicle, even if the vehicle is parked outside the GPS area, the agent can obtain the path to run before moving the vehicle.

In addition, according to another disclosed feature, there is provided a communication apparatus including a communication part for performing communication with the outside, a parking positional information holding part for holding parking positional information, a map display system, and a conversion part for converting the parking positional information held by the parking positional information holding part into information that can be display by the map display system. According to this structure, also in the case where the parking position can be easily specified as a parking lot under management by an integral system or a famous spot, and a simple code is assigned to the parking positional information, the information can be incorporated into a map display system handling positional information by latitude and longitude, for example.

In addition, according to another disclosed feature, there is provided a communication apparatus including a parking positional information holding part for holding parking positional information, a reception part for receiving process system for processing parking positional information, and a display part for displaying parking positional information processed by the process system received by the reception part. Thus, when looking for a vehicle parked in a wide parking lot, the process system provided locally to the parking lot is received so that the parking position of the vehicle in the parking lot can be specified in the case where the parking positional information is held that is valid only in the parking lot. This is useful in the case where the substitute drive service is requested or the vehicle is borrowed, and the vehicle in the parking lot is being looked for, or in the case where a person who parked his or her vehicle forgot the position of the parked vehicle.

INDUSTRIAL APPLICABILITY

The present invention is useful for establishing a keyless entry system of a vehicle or a house.

The invention claimed is:

1. A vehicle system including a vehicle and a cellular phone in cooperation with the vehicle, comprising:
   a vehicle to be parked by a driver carrying a cellular phone;
   a control part arranged to have the cellular phone store information relating to a position of parking the vehicle in automatic response to a stop of the vehicle; and
   an information holding part in the cellular phone arranged to hold the information in response to the control part to keep the information within the cellular phone even if the driver carrying the cellular phone leaves the vehicle
   wherein the cellular phone includes a telephone functional part for making a communication with another cellular phone carried by another person who has not known the position of parking the vehicle, and wherein the telephone function part is arranged to transmit the information to the other cellular phone for the other person carrying the other cellular phone to know the position of parking the vehicle and easily access the vehicle, and
   wherein the cellular phone includes an entry qualification holding part arranged to hold entry qualification information to enter the vehicle, and wherein the telephone function part is arranged to transmit the entry qualification information to the other cellular phone for another person carrying the other cellular phone to enter and drive the vehicle.

2. The vehicle system according to claim 1, wherein the vehicle has an engine, and wherein the control part is arranged to have the cellular phone store the information in automatic response to a stop of the engine of the vehicle.

3. The vehicle system according to claim 1, wherein the information is derived from GPS system, and wherein the control part is arranged to have the cellular phone store the latest information before the stop of the vehicle.

4. The vehicle system according to claim 1, wherein the information is indicative of a parking area where the vehicle is stopped.

5. The vehicle system according to claim 1, wherein the information is indicative of a specific parking position at which the vehicle is stopped.

6. The vehicle system according to claim 1, wherein the cellular phone includes a display part arranged to indicate the position of parking the vehicle in accordance with the information held by the information holding part for the driver to easily come back to the vehicle.

7. The vehicle system according to claim 1, wherein the information relating to the position of parking the vehicle cannot be received by the other cellular phone unless the entry qualification information is received by the other cellular phone.

8. In a vehicle system including a vehicle and a cellular phone in cooperation with the vehicle, the vehicle comprising:

an operating part relating to stop of the vehicle;

a control part arranged to have the cellular phone store information relating to a position of parking the vehicle in automatic response to the operating part to stop the vehicle; and an entry qualification system for a driver carrying the cellular phone to enter and drive the vehicle, the entry qualification system is arranged to qualify entry qualification information from another cellular phone to which the entry qualification information has been transmitted, by the cellular phone carried by the driver, along with the information relating to the position of parking the vehicle the other cellular phone being carried by another person who has not known the position of parking the vehicle unless the information relating to the position of parking the vehicle has been transmitted to the other cellular phone.

9. The vehicle according to claim 8, wherein the operating part is an engine, and wherein the control part is arranged to have the cellular phone store the information in automatic response to a stop of the engine of the vehicle.

10. The vehicle according to claim 8 further comprising GPS system, wherein the information is an output of the GPS system.

11. The vehicle according to claim 10, wherein the control part is arranged to have the cellular phone store the output of the GPS system when the vehicle is stopped.

12. The vehicle according to claim 10, wherein the control part is arranged to have the cellular phone store the latest output of the GPS system before the stop of the vehicle.

13. In a vehicle system including a vehicle and a cellular phone in cooperation with the vehicle, the cellular phone comprising:

a control part arranged to have the cellular phone store information relating to a position of parking the vehicle in automatic response to a signal from the vehicle which is stopped; and an information holding part in the cellular phone arranged to hold the information in response to the control part to keep the information within the cellular phone even if the driver carrying the cellular phone leaves the vehicle; and a telephone functional part for making a communication with another cellular phone carried by another person who has not known the position of parking the vehicle, wherein the telephone function part is arranged to transmit the information to the other cellular phone for the other person carrying the other cellular phone to know the position of parking the vehicle and easily access the vehicle, and wherein the cellular phone includes an entry qualification holding part arranged to hold entry qualification information to enter the vehicle, and wherein the telephone function part is arranged to transmit the entry qualification information to the other cellular phone for another person carrying the other cellular phone to enter and drive the vehicle.

14. The cellular phone according to claim 13, wherein the vehicle has an engine, and wherein the signal from the vehicle is indicative of a stop of the engine of the vehicle.

15. The cellular phone according to claim 13, wherein the information is indicative of a parking area where the vehicle is stopped.

16. The cellular phone according to claim 13, wherein the information is indicative of a specific parking position at which the vehicle is stopped.

17. The cellular phone according to claim 13 further comprising a display part arranged to indicate the position of parking the vehicle in accordance with the information held by the information holding part for the driver to easily come back to the vehicle.

18. The cellular phone according to claim 13, wherein the information relating to the position of parking the vehicle cannot be received by the other cellular phone unless the entry qualification information is received by the other cellular phone.

* * * * *